US008686996B2

(12) United States Patent
Cheung et al.

(10) Patent No.: US 8,686,996 B2
(45) Date of Patent: *Apr. 1, 2014

(54) SYSTEM AND METHOD FOR ANALYZING AND IMAGING THREE-DIMENSIONAL VOLUME DATA SETS USING A THREE-DIMENSIONAL SAMPLING PROBE

(75) Inventors: Yin L. Cheung, Sugar Land, TX (US); Michael J. Zeitlin, Houston, TX (US); Mark Acosta, Houston, TX (US)

(73) Assignee: Landmark Graphics Corporation, Houston, TX (US)

(*) Notice: Subject to any disclaimer, the term of this patent is extended or adjusted under 35 U.S.C. 154(b) by 1301 days.

This patent is subject to a terminal disclaimer.

(21) Appl. No.: 10/806,980

(22) Filed: Mar. 22, 2004

(65) Prior Publication Data
US 2004/0174357 A1    Sep. 9, 2004

Related U.S. Application Data

(63) Continuation of application No. 09/119,635, filed on Jul. 21, 1998, now Pat. No. 6,765,570.

(51) Int. Cl.
*G06T 15/00* (2011.01)
(52) U.S. Cl.
USPC ............................ 345/420; 345/424; 345/848
(58) Field of Classification Search
USPC .......... 345/420, 424, 473, 474, 434, 848–861
See application file for complete search history.

(56) References Cited

U.S. PATENT DOCUMENTS

| | | | |
|---|---|---|---|
| 4,359,766 A | 11/1982 | Walters et al. | |
| 4,467,461 A | 8/1984 | Rice | 367/70 |
| 4,751,643 A | 6/1988 | Lorensen et al. | 364/414 |
| 4,984,157 A | 1/1991 | Cline et al. | 367/413 |
| 5,056,066 A | 10/1991 | Howard | |
| 5,148,494 A | 9/1992 | Keskes | |
| 5,313,567 A | 5/1994 | Civanlar et al. | |
| 5,410,250 A | 4/1995 | Brown | 324/309 |

(Continued)

FOREIGN PATENT DOCUMENTS

| | | | |
|---|---|---|---|
| EP | 0228231 B1 | 7/1987 | |
| JP | 6-236440 B1 | 8/1994 | |

(Continued)

OTHER PUBLICATIONS

Viega et al., 3D Magic Lenses, ACM press, Proceeding of the 9th annual ACM symposium on User Interface software and technology, Nov. 1996, pp. 51-58.*

(Continued)

*Primary Examiner* — Phu K Nguyen
(74) *Attorney, Agent, or Firm* — Crain, Caton & James; Bradley A. Misley

(57) ABSTRACT

System and method for analyzing and imaging three-dimensional volume data sets using a three-dimensional sampling probe. A number of sampling probes can be created, shaped, and moved interactively by the user within the whole three-dimensional volume data set. As the sampling probe changes shape, size, or location in response to user input, the image is re-drawn at a rate sufficiently fast to be perceived as real-time by the user. In this manner, the user can more easily and effectively visualize and interpret the features and physical parameters that are inherent in the three-dimensional volume data set.

52 Claims, 14 Drawing Sheets

(56) References Cited

U.S. PATENT DOCUMENTS

| | | | |
|---|---|---|---|
| 5,432,751 A | 7/1995 | Hildebrand | |
| 5,455,896 A | 10/1995 | Takamura | 395/119 |
| 5,458,111 A | 10/1995 | Coin | |
| 5,555,352 A | 9/1996 | Lucas | |
| 5,563,949 A | 10/1996 | Bahorich et al. | 364/421 |
| 5,570,460 A | 10/1996 | Ramanujam | |
| 5,574,836 A | 11/1996 | Broemmelsiek | 395/127 |
| 5,586,082 A | 12/1996 | Anderson et al. | 367/73 |
| 5,630,034 A | 5/1997 | Oikawa et al. | |
| 5,659,691 A | 8/1997 | Durward et al. | 395/329 |
| 5,722,408 A | 3/1998 | Dehner et al. | |
| 5,734,384 A | 3/1998 | Yanof et al. | 345/424 |
| 5,759,044 A | 6/1998 | Redmond | 434/301 |
| 5,781,194 A | 7/1998 | Ponomarev et al. | |
| 5,798,982 A | 8/1998 | He et al. | 367/73 |
| 5,838,564 A | 11/1998 | Bahorich et al. | |
| 5,839,440 A | 11/1998 | Liou | |
| 5,852,447 A | 12/1998 | Hosoya et al. | 345/468 |
| 5,877,768 A | 3/1999 | Jain | |
| 5,892,732 A | 4/1999 | Gersztenkorn | |
| 5,930,730 A | 7/1999 | Marfurt et al. | 702/16 |
| 5,949,424 A | 9/1999 | Cabral et al. | |
| 5,956,041 A | 9/1999 | Koyamada et al. | |
| 5,966,672 A | 10/1999 | Knupp | 702/16 |
| 5,970,499 A | 10/1999 | Smith et al. | |
| 6,018,347 A | 1/2000 | Willis | |
| 6,049,759 A | 4/2000 | Etgen | |
| 6,064,771 A | 5/2000 | Migdal et al. | |
| 6,075,538 A | 6/2000 | Shu et al. | |
| 6,083,162 A | 7/2000 | Vining | 600/407 |
| 6,106,561 A | 8/2000 | Farmer | |
| 6,144,383 A | 11/2000 | Lichtenbelt et al. | 345/419 |
| 6,191,787 B1 | 2/2001 | Lu et al. | |
| 6,219,059 B1 | 4/2001 | Argiro | |
| 6,240,360 B1 | 5/2001 | Phelan | |
| 6,342,891 B1 * | 1/2002 | Fenster et al. | 345/473 |
| 6,674,430 B1 | 1/2004 | Kaufman et al. | |
| 6,765,570 B1 * | 7/2004 | Cheung et al. | 345/420 |
| 6,912,468 B2 * | 6/2005 | Marin et al. | 702/14 |
| 7,006,085 B1 * | 2/2006 | Acosta et al. | 345/419 |
| 7,502,026 B2 * | 3/2009 | Acosta et al. | 345/424 |
| 7,616,213 B2 * | 11/2009 | Chuter | 345/584 |

FOREIGN PATENT DOCUMENTS

| | | |
|---|---|---|
| JP | 7-057118 B1 | 3/1995 |
| WO | WO96/18915 | 6/1996 |
| WO | 9707467 A1 | 2/1997 |

OTHER PUBLICATIONS

Speray et al., Volume Probes: Interactive Data Exploration on Arbitrary Grids, Proceedings of the 1990 workshop on Volume Visualization, Nov. 1990, pp. 5-12.*

Landmark Graphics' Operational Manual on "SeisCube," Oct. 1996, pp. 1-272.

Landmark Graphics' Operational Manual on "OpenVision," Jul. 1997, pp. 1-169.

Antosh, Nelson, "Oil Now Showing at a Theater Near You," Sep. 19, 1997, 2 pages, *Houston Chronicle*, Business Section C.

"CogniSeis Turns Up the Volume with the Latest Release of VoxelGeo," Press Release, Apr. 30, 1997 (printed Mar. 27, 1998), 2 pages.

Compton, Mark, "A Dream Comes True," Jun. 1997, 3 pages, IRIS Universe #26.

Gatti, C., D. Marini, P., Minardi, "An Interactive System for Volume Analysis," published 1993, Scientific Visualization Advanced Software Techniques, Section 3.2.

GeoQuest, IESX "Integrated Multisurvey Interpretation," May 3, 1998, 17 pages, printed from Schlumberger website www.slb.com/oilf/geoquest/iesx/iesx.html.

"GeoQuest at a glance," printed May 3, 1998, 3 pages, printed from Schlumberger website www.slb.com/ar94/html/geoquest.html.

"GeoQuest Enhances GeoViz and Voxels for OCTANE," 1997 (printed May 3, 1998), 3 pages, printed from GeoQuest/Schlumberger website www/sgi.com/Products/hardware/desktop/partners/octane/geoquest.

Goldman, Jon and Roy, Trina M., "The Cosmic Worm," Jul. 1994, pp. 12-14, *IEEE Computer Graphics and Applications*, vol. 14, No. 4.

Gras, Rutger, "Automated 3-D Software Interprets Fault Systems," May 1998, pp. 81-83, *World Oil*.

Hutchinson, Suzi, "FZAP! 1.0 Offers Automated Fault Picking," printed Mar. 27, 1998, 5 pages, UserNet—May/Jun. 1997, printed from Landmark Graphics website www.lgc.com/UserNet/mj97/mj97*4.html.

Koen, A. D. "Tough Economics Remold Production R & D Campaign," Jul. 5, 1993, pp. 14-18, *Oil & Gas Journal*.

Peloso, Andy, "Open Vision 4.0," printed Mar. 27, 1998, 8 pages, UserNet—May/Jun. 1997, printed from Landmark Graphics website www.lgc.com/UserNet/mj97/mj97-3.html.

Pepke, Eric "Animation and the Examination of Behavior Over Time," 1995, pp. 203-238, *Computer Visulization Graphics Techniques for Scientific and Engineering Analysis*, Chapter 7.

Petzet, G. Alan, "Interactive 3D Visualization Speeds Well, Reservoir Planning," Nov. 24, 1997, pp. 82-83 (copied on 1 page), *Oil & Gas Journal*.

Scheier, Robert L., "Creating a Cash Gusher," Apr. 21, 1997, pp. 76-78, *Computerworld* (www.computerworld.com).

Shamban, Adam, Jones, Gary and Wright, Carole, "EarthCube 1.2: New Functionality and Work Flows," printed Mar. 27, 1998, 8 pages, UserNet—May/Jun. 1997, printed from Landmark Graphics website www.lgc.com/UserNet/mj97/mj97-5.html.

"Texaco Announces the Opening of New 3-D Visualization Center in Houston," Nov. 11, 1997, p. 11111454, *Business Wire*.

"Texaco E&P Center Allows Visual Probe Of 3D Data Volumes," Jun. 1, 1998, pp. 46-47 (copied on one page), *Oil & Gas Journal*.

Thomas, Kate, "Oil Biz Gushes Patents," Feb. 16, 1998, pp. 1, 26, *The National Law Journal*.

"VoxelGeo," printed Mar. 27, 1998, 5 pages, Paradigm Geophysical Broadband Solutions in Depth, printed from CogniSeis website www.cogniseis.com/voxelgeo.html.

Zeitlin, Michael, "3-D Seismic Visualization," Mar. 12, 1998, 1 page, presentation given at the Emerging Technologies Group Dinner Meeting, printed from www.hougeo.org/meet0398.htm.

Zeitlin, Michael, "Integration Strategy Takes Full Advantage of 3-D Seismic Capability," May 1995, pp. 59-60, *World Oil*.

Zeitlin, Michael, "Visualization Brings a New Dimension to Oil Exploration and Production," Jun. 1992, pp. 36-39, *GEOBYTE*.

William P. Jensen, Plaintiffs' First Amended Complaint, Dec. 8, 2005, 6 pages, US.

Edward F. Guzman, Defendant Seismic Micro-Technology, Inc.'s Answer and Counterclaims to Plaintiffs' First Amended Complaint, Feb. 22, 2006, 18 pages (with Exhibit A [7 pages ]and Exhibit B [8 pages]), US.

Eric J.R. Nichols, Defendant Paradigm Geophysical Corporation's Answer and Affirmative Defenses to Plaintiffs' First Complaint, Dec. 22, 2005. 7 pages, US.

Parker, "Systems Aspect of Visualization Applications" 1995, ISBN: 0849390508 Soloman Press, pp. 1-336.

Wang et al. "Volume Sculpting" ACM 1995, Proceeding of the 1995 symposium of Interactive 3D graphics pp. 151-156, Apr. 1995.

Holden, Paul, "9. Editing the Volume," VoxelGeo 1.1 User's Guide, Revised Mar. 1994, 28 pgs.

"VoxelGeo Consortium Meeting Summary," CogniSets Development, Jun. 13, 1996, 2 pgs.

Close, Howard L., "Defendant Seismic Micro-Technology, Inc.'s Answer, Affirmative Defenses, and Counterclaims in Response to Plaintiffs' Second Amended Complaint," (Jul. 10, 2006), 16 pgs.

Nichols, Eric J.R., "Paradigm's Answer and Affirmative Defenses to Plaintiffs' Second Amended Complaint," (Jul. 27, 2006), 8 pgs.

Holden, Paul; VoxelGeo 1.1.1; Productivity Tool for the Geosciences; Release Notes (1994) & User's Guide (Rev. Mar. 1994); Vital Images, Inc., pp. 1-461.

Parker, David, "Systems Aspects of Visualization Applications" System Architecture, 1995, pp. 241-265.

(56) References Cited

OTHER PUBLICATIONS

Wang, Sidney W., "Volume Sculpting", Symposium on Interactive 3D Graphics, 1995, 7 pages.

VoxelGeo, "Paradigm Geophysical Broadband Solutions in Depth", Mar. 27, 1998, 5 pages, printed from Cogniseis website www.cogniseis.com/voxelgeo.htm Mar. 27, 1998.

Holden, Paul, "VoxelGeo 1.1.1; Productivity Tool for the Geosciences", Release Notes, User's Guide (Rev. Mar. 1994), Vital Images, Inc., pp. 1-461.

Neider, et al, "Multitexturing", OpenGL Programming Guide, pp. 422-427, Silicon Graphics, Inc., Addison-Wesley Professional, 3rd Edition.

Levin, Stewart A., "Resolution in Seismic Imaging: Is it all a Matter of Perspective?", Geophysics 83(2); Mar.-Apr. 1998; pp. 743-749, vol. 63, No. 2, U.S.A.

Tanner, et al, "Paleo Siesmic and Color Acoustic Impedence Sections", Application of Downward Continuation in Structural and Stratigraphic Context, 1982, pp. 110-111, Expanded Abstract S8.7, 52nd Annual Meeting of The Society of Exploration Geophysicists, Dallas, Texas, U.S.A.

Yilmaz, Lucas, "Prestack ayer Replacement", Geophysics 51(7); Jul. 1986; 15 Pages; vol. 51, No. 7; U.S.A.

Foley, et al., "Computer Graphics", Principles and Practice (2nd Ed.), 1990, p. 838; Addison Wesley, Boston, Massachusetts, U.S.A.

Lin, et al., "VIrtual Reality for Geosciences Visualization", 1998, Proceedings, 3rd Asia Pacific Shonan Village Center; Japan; Jul. 15-17, 1996, pp. 196-201, IEEE Comput. Soc. Las Alamitos, California, U.S.A.

Cortesi, "React Real Time Programmer's Guide", Mar. 18, 1997, 187 Pages, Silicon Graphics Inc. California, U.S.A.

Cabral, et al., "Accelerated Volume Rendering and Tomographic Reconstruction Using Texture Mapping Hardware", 1995, pp. 91-98, Association for Computing Machinery, New York, U.S.A.

Cullip, Timothy and Neumann, Ulrich, "Accelerating Volume Reconstruction with 3D Texture Hardware", 1993, 6 pages, University of North Carolina, Chapel Hill, U.S.A.

Cignoni, Montani, Scopigno, "MagicSphere: an insight tool for 3D data visualization", 1994, pp. 317-328, vol. 13(3), Computer Graphics Forum, The Eurographics Association and Blackwell Publishing Ltd. Oxford, U.K.

Yagel Roni, "The Flipping Cube: A Device for Rotating 3D Rasters", "Advances in Computer Graphics Hardware (Machines)", 1991, pp. 86-99.

Höllerer, Hege, Stallings, "Visualization and 3D-Interaction for Hyperthermia Treatment Planning," 1995, 7 Pages, Proceedings, 9th International Symposium on Computer Assisted Radiology, CH Volume Visualization Workshop, Berlin, Germany.

Levoy Marc, "Design for a Real-Time High-Quality Volume Rendering Workstation", Proceedings of the Chapel Hill Workshop on Volume Visualization, 1969, pp. 85-92, Association for Computing Machinery, New York, U.S.A.

Kanus, et al, "Implimentations of Cube-4 on the Teramac Custom Computing Machine", "Computers and Graphics", 1997, 18 Pages, vol. 21, Elsevier, London, U.K.

Brady, et al, "Crumbs: a virtual environment tracking tool for biological imaging", IEEE Symposium on Frontiers in Biomedical Visualization, 1995, pp. 18-25, 82, IEEE Computer Society, Washington DC, U.S.A.

Fraser Robert, "Interactive Volume Rendering Using Advanced Gaphics Architectures", Silicon Graphics Computer Systems, Dec. 22, 1994, 8 Pages, Mountain View, California, U.S.A.

Kulic, "Building an OpenGL Volume Renderer" "SGI Development News", 1990, 9 pages.

Serra, et al., "Interactive Vessel Tracing in Volume DATA", 1997, pp. 131-137, "Symposium on 3D Grapics", Providence, Rhode Island, U.S.A.

Pfister, Kaufman, "Cube 4—A Scalable Architecture for Real-Time Volume Rendering," Proceedings 1996 IEEE Symposium on Volume Visualization, Oct. 28-29, 1996, pp. 47-54, 100.

Speray, Kennon, "Volume Probes: Interactive data Exploration on Arbitrary Grids" Computer Graphics, vol. 24 issue 5, Nov. 1990, pp. 5-12, Association for Computing Machinery, on New York, U.S.A.

Lorensen, Cline, "Marching Cubes: A High Resolution 3D Surface Construction Algorithm," Computer Graphics, vol. 21 issue 4, Jul. 1987, pp. 163-169, Association for Computer Machinery, Schenectady, New York, U.S.A.

Durkin, Hughes, "Nonpolygonal Isosurface Rendering for Large Volume Datasets", "Proceedings of the conference on Visualization '94", 1994, pp. 293-300, IEEE Computer Society Press, Los Alamitos, California, U.S.A.

Ney, Fishman, "Editing Tools for 3D Medical Imaging," IEEE Computer Graphic & Applications, Nov. 1991, pp. 63-71, vol. 11 issue 6, IEEE Computer Society Press, Los Alamitos, California, U.S.A.

Lacroute, "Fast Volume Rendering Using a Shear-Warp Factorization of the Viewing Transformation", Doctoral dissertation submitted to Departments of Electrical Engineering and Computer Science Stanford University, Sep. 1995, 236 Pages, Stanford University, Stanford, California, U.S.A.

Bajaj, et al., "Fast Isocontouring for Improved Interactivity", Proc. ACM SIGGRAPH/IEEE Symposium on Volume Visualization (ACM Press, 1996), 11 pages.

"Computing," Mechanical Engineering Magazine, The American Society of Mechanical Engineers, Oct. 1996, 8 Pages.

IRIS Universe No. 36, Silicon Graphics Inc., Summer 1996, 97 Pages.

Yagel. et al., "Hardware Assisted Volume Rendering of Unstructured Grids by Incremental Slicing", Department of Computer and Information Science, The Ohio State University, pp. 1-11, 1996, Ohio. U.S.A.

Elvins T.T., "A Survey Algorithms for Volume Visualization" Computer Graphics, ACM, US, vol. 26, No. 3, Aug. 1, 1992, pp. 194-201.

Crawfis R.A. et al., A Scientific Visualization Synthesizer, Visualization 1991 Proceedings, IEEE Conference on Oct. 22, 1992, pp. 262-267, San Diego, California, U.S.A.

Yagel, et al., Hardware Assisted Volume Rendering of Unstructured Grids by Incremental Slicing, Proceedings 1996 IEEE Symposium on Volume Visualization, Oct. 28-29, 1996, pp. 55-62.

VoxelGeo version 2.2 Product Definition version 14, May 1996, 21 Pages. Cogniseis Development, Inc., Houston, Texas. U.S.A.

VoxelGeo User's Manual 2.1.5, Oct. 1996, 214 Pages, Cogniseis Development, Inc., Houston, Texas, U.S.A.

Transcript of Jan. 11-12, 2007 deposition of Alan Craig, including exhibits, 130 Pages.

Transcript of Jan. 12, 2007 deposition of William Lane, 38 Pages.

Transcript of Jan. 12, 2007 deposition of Jeff Carpenter, 11 Pages.

Alexander, Fields, Paradigm's Preliminary Invalidity Contentions in Case 4:05-CV-02618, Mar. 30, 2007, 51 Pages, Beck, Redden & Secrest, Houston, Texas.

Schwenden, Mark and Curtis, Carolyn, Silicon Graphics Onyx2 Deskside Workstation Owners Guide, 146 Pages, Mountain View, California.

Leleux, David E.; What's new in Geophysics and Seismic-Related Operations; World Oil; May 1996; pp. 67-68.

Hof, Robert D.; The Gee-Whiz Company: Silicon Graphics Turns 3-D Images into Stunning Profits; Business Week; Jul. 1994; pp. 46-52.

Bozman, Jean S.; Real Distributed Computing; Computerworld; Sep. 1994; vol. 28 No. 37; pp. 114-115.

Texaco Redefines Oil and Gas Exploration and Production with Silicon Graphics Reality Center: Business Tool Expected to Dramatically Improve Texaco's Drilling Success; PR Newswire; 1997; <http://www.prnewswire.com/news-releases/texaco-redefines-oil-and-gas-exploration-and-production-with-silicon-graphics-reality-center-77487722.html>, Nov. 11, 2011.

Fisher, Daniel; Exploration: Giant 3D Screen Helps Hunt for Oil; Calgary Herald, Canadian Newspaper; 1997.

"eSeis, Inc.", http://www.e-seis.com/, 1pg., reviewed Nov. 21, 2011.

"Genetek Earth Research EarthWorks Exploration System", http://www.genetek.com, 1pg., reviewed Nov. 21, 2011.

(56) References Cited

OTHER PUBLICATIONS

"Genetek Earth Research EarthWorks Exploration System", http://www.genetek.com/EarthWorks%20Overview.html, 9pgs., reviewed Nov. 21, 2011.

Achenback, S.; Curved Multiplanar Reconstructions for the Evaluation of Contrast-Enhanded Electron Beam CT of the Coronary Arteries; American Journal of Roentgenology, Baltimore, MD; vol. 170, No. 4; Apr. 1998; pp. 895-899.

Joe Miss, Gordon Kindlmann, Charles Hansen; Multi-Dimensional Transfer Functions for Interactive Volume Rendering, Scientific Computing and Imaging Institute, Oct. 21, 2001; 15 pages; School of Computing, University of Utah, Utah, USA.

* cited by examiner

SYSTEM AND METHOD FOR ANALYZING AND IMAGING THREE-DIMENSIONAL VOLUME DATA SETS USING A THREE-DIMENSIONAL SAMPLING PROBE

CROSS-REFERENCE TO RELATED APPLICATIONS

This application is a continuation of U.S. application Ser. No. 09/119,635 filed on Jul. 21, 1998, now U.S. Pat. No. 6,765,570 which is hereby incorporated by reference. Applicants therefore, claim priority based on the filing date of U.S. application Ser. No. 09/119,635.

BACKGROUND OF THE INVENTION

1. Field of the Invention

The present invention relates generally to imaging of three-dimensional ("3D") volume data sets. More particularly, the present invention relates to fast visualization and analysis of very large 3D volume data sets using 3D computer graphics.

2. Related Art

Many fields of endeavor require the analysis and imaging of three-dimensional ("3D") volume data sets. For example, in the medical field, a CAT (computerized axial tomography) scanner or a magnetic resonance imaging (MRI) device is used to produce a "picture" or diagnostic image of some part of a patient's body. The scanner or MRI device generates a 3D volume data set that needs to be imaged or displayed so that medical personnel can analyze the image and form a diagnosis.

Three-dimensional volume data sets are also used in various fields of endeavor relating to the earth sciences. Seismic sounding is one method for exploring the subsurface geology of the earth. An underground explosion or earthquake excites seismic waves, similar to low frequency sound waves, that travel below the surface of earth and are detected by seismographs. The seismographs record the time of arrival of the seismic waves, both direct and reflected waves. Knowing the time and place of the explosion or earthquake, the time of travel of the waves through the interior can be calculated and used to measure the velocity of the waves in the interior. A similar technique can be used for offshore oil and gas exploration. In offshore exploration, a ship tows a sound source and underwater hydrophones. Low frequency (e.g., 50 Hz) sound waves are generated by, for example, a pneumatic device that works like a balloon burst. The sounds bounce off rock layers below the sea floor and are picked up by the hydrophones. In this manner, subsurface sedimentary structures that trap oil, such as faults, folds, and domes, are "mapped" by the reflected waves. The data is processed to produce volume data sets that include a reflection or seismic amplitude data value at specified (x, y, z) locations within a geographic space.

A 3D volume data set is made up of "voxels" or volume elements. Each voxel has a numeric value for some measured or calculated property, e.g., seismic amplitude, of the volume at that location. One conventional approach to generating an image of a 3D volume data set is to cross-section the 3D volume data set into a plurality of two-dimensional ("2D") cross-sections or slices. The image of the 3D volume data set is then built as a composite of the 2D slices. For example, the image of the 3D volume data set is generated by stacking the 2D slices in order, back-to-front, and then composited into a complete image. The user sees the image being built layer by layer as the composite grows. Although the user can see the internal organization or structure of the volume as the composite image grows, the traditional slice and composite technique is typically slow, particularly when very large 3D volume data sets are being used. Additionally, the slice and composite technique clutters the user's field of view with extraneous information, and interferes with the user's ability to accurately visualize and interpret features inherent in the 3D volume data set.

Computer software has been developed specifically for imaging 3D seismic data sets for the oil and gas industry. Examples of such conventional computer programs include VoxelGeo, available from Paradigm Geophysical, Houston, Tex., SeisWorks and EarthCube, available from Landmark Graphics Corporation, and IESX, available from GeoQuest. Such conventional computer programs have numerous deficiencies that preclude a user from quickly and accurately visualizing and interpreting features inherent in a 3D seismic data set. Conventional computer programs for visualizing and interpreting 3D seismic data operate on the full 3D volume of seismic data. Consequently, every time a change is made, such as a change to the transparency or opacity settings, the full 3D volume of seismic data must be processed, and the image redrawn. Even when such programs are run on highly efficient graphics supercomputers, the delay or lag in re-drawing the image is perceptible to the user. For a 3D volume containing 500 megabytes of seismic data, it can take on the order of 30–45 seconds for conventional programs to re-draw the complete image (frame rate of 0.03 to 0.02 frames per second, respectively). During the 30–45 second delay time, the mind of the user loses focus on the feature of interest, making it difficult to completely and properly analyze the seismic data.

Some conventional 3D seismic interpretation programs provide the capability to visualize and interpret a piece of the full 3D volume of seismic data. The user identifies the coordinates of the selected piece via a menu command. An image of the selected piece is drawn. The selected piece can then be rotated, if desired, at that location. However, to look at a different piece of the full 3D volume of seismic data, such as to follow a geologic feature that has been tentatively identified, the image must be interrupted, a new location or coordinates for the different piece is entered, and a new image is drawn containing the different piece. The interruption in the displayed image makes it difficult for the user to visualize any continuity between the two pieces of the full 3D volume of seismic data that have been imaged. This impedes the user's ability to interpret and identify the geologic features that are inherent in the full 3D volume of seismic data. Additionally, even though only a piece of the full 3D volume of seismic data is being visibly displayed, conventional 3D seismic interpretation programs continue processing the full 3D volume of seismic data to draw the image, thereby slowing the display of the image to the user.

Conventional 3D seismic interpretation programs provide the capability to "auto pick" and identify points that satisfy a voxel selection algorithm. However, these programs typically iterate through the full 3D volume of seismic data to identify the points that satisfy the voxel selection algorithm. This is time consuming even on a high speed graphics supercomputer. Additionally, conventional 3D seismic interpretation programs do not provide the capability to directly delete from the collection of picked voxels. The only way to "eliminate" points from the collection of picked voxels using conventional 3D seismic interpretation programs is to repeatedly adjust the selection criteria for the voxel selection algorithm until the points to be eliminated fall outside of the selection criteria for the displayed points that satisfy the voxel selection algorithm. Each time the selection criteria is adjusted, the image must be interrupted. This iterative process is time consuming, and interferes with the visualization process of the user.

Thus, there is a need in the art for a system and method for imaging 3D volume data sets that overcomes the deficiencies detailed above. Particularly, there is a need for a system and method that re-draws images of large 3D volume data sets in response to user input at a rate sufficiently fast that the user perceives an instantaneous or real-time change in the image, without perceptible delay or lag. There is a need for a system and method that allows a user to interactively change the displayed image in a continuous manner, without interruption or perceptible delay or lag. Such a system and method would allow a user to more quickly and accurately interpret and identify features inherent in 3D volume data sets.

SUMMARY OF THE INVENTION

The present invention is directed to a system and method for analyzing and imaging 3D volume data sets using a 3D sampling probe. In one aspect of the invention, a program storage device is provided. The program storage device is readable by a machine, and tangibly embodies a program of instructions executable by the machine to perform method steps of imaging a 3D volume defined by a data set of voxels, each voxel expressed in the form of (x, y, z, data value). The method steps comprise the following steps:
  a. creating one or more three-dimensional (3D) sampling probe(s), wherein each 3D sampling probe is a sub-volume of the 3D volume;
  b. drawing an image of the 3D sampling probe(s) for display to a user, the image comprising an intersection of the 3D sampling probe(s) and the 3D volume; and
  c. repeating drawing step (b) responsive to input from the user to move a location of the 3D sampling probe(s) within the 3D volume so that as the 3D sampling probe(s) moves through the 3D volume, the image of the 3D sampling probe(s) is re-drawn sufficiently fast to be perceived as real-time by the user, thereby enabling the user to visualize a feature defined by the data values.

In another aspect of the invention, the method steps further comprise the following step:
  d. repeating drawing step (b) responsive to input from the user to re-shape the 3D sampling probe(s) so that as the 3D sampling probe(s) is changed in shape, the image of the 3D sampling probe(s) is re-drawn sufficiently fast to be perceived as real-time by the user.

In a further aspect of the invention, the method steps further comprise identifying a seed point that is within a data set of voxels that defines an auto picking 3D sampling probe, and defining a selection criteria based on data values. Points connected to the seed point that have data values satisfying the selection criteria are identified as selected points. As the auto picking 3D sampling probe moves through the 3D volume, the image of the auto picking 3D sampling probe contains selected points within the auto picking 3D sampling probe sub-volume, and the image is re-drawn sufficiently fast to be perceived as real-time by the user.

In yet a further aspect of the invention, the method steps further comprise defining an eraser 3D sampling probe, and defining a de-selection criteria based on data values. Points previously selected by an auto picking operation that satisfy the de-selection criteria are identified as candidates for de-selection. As the eraser 3D sampling probe moves through the 3D volume, the de-selected points are deleted from the image, and the image is re-drawn sufficiently fast to be perceived as real-time by the user.

In still a further aspect of the present invention, a method is provided for imaging a three-dimensional (3D) data volume representing a geographic space for visualization and interpretation of physical parameters of the geographic space by a user, wherein the 3D data volume is defined by a data set of voxels, each voxel expressed in the form of (x, y, z, data value), the method comprising:
  a. creating one or more three-dimensional (3D) sampling probe(s), wherein each 3D sampling probe is a sub-volume of the 3D data volume;
  b. drawing an image of the 3D sampling probe(s) for display to a user, the image comprising an intersection of the 3D sampling probe(s) and the 3D data volume; and
  c. repeating drawing step (b) responsive to input from the user to move a location of the 3D sampling probe(s) within the 3D data volume so that as the 3D sampling probe(s) moves through the 3D data volume, the image of the 3D sampling probe(s) is re-drawn sufficiently fast to be perceived as real time by the user, thereby enabling the user to visualize and interpret physical parameters in the geographic space.

In still a further aspect of the invention, a computer program product is provided that comprises a computer useable medium having computer program logic recorded thereon for enabling a processor in a computer system to image a three-dimensional (3D) seismic data volume for visualization and interpretation of geologic features by a user, the 3D seismic data volume being defined by a data set of voxels, each voxel expressed in the form of (x, y, z, seismic amplitude). The computer program product comprises: probe creating means for enabling the processor to create one or more three-dimensional (3D) sampling probe(s), each 3D sampling probe being a sub-volume of the 3D seismic data volume; image drawing means for enabling the processor to draw an image of the 3D sampling probe(s) for display to a user, the image comprising an intersection of the 3D sampling probe(s) and the 3D seismic data volume; and drawing repeating means for enabling the processor to repeatedly draw responsive to input from the user to move a location of the 3D sampling probe(s) within the 3D seismic data volume so that as the 3D sampling probe(s) moves through the 3D seismic data volume, the image of the 3D sampling probe(s) is re-drawn sufficiently fast to be perceived as real-time by the user, thereby enabling the user to visualize and interpret geologic features.

In yet a further aspect of the invention, a system is provided for imaging a three-dimensional (3D) seismic data volume for visualization and interpretation of geologic features by a user, the 3D seismic data volume being defined by a data set of voxels, each voxel expressed in the form of (x, y, z, seismic amplitude). The system comprises: means for creating one or more three-dimensional (3D) sampling probe(s), each 3D sampling probe being a sub-volume of the 3D seismic data volume; image drawing means for drawing an image of the 3D sampling probe(s) for display to a user, the image comprising an intersection of the 3D sampling probe(s) and the 3D seismic data volume; and drawing repeating means for repeatedly drawing the image of the 3D sampling probe(s) responsive to input from the user to move a location of the 3D sampling probe(s) within the 3D seismic data volume so that as the 3D sampling probe(s) moves through the 3D seismic data volume, the image of the 3D sampling probe(s) is re-drawn sufficiently fast to be perceived as real-time by the user, thereby enabling the user to visualize and interpret geologic features.

Features and Advantages

It is a feature of the present invention that, as a user interactively moves a 3D sampling probe through a 3D volume data set, the image on the surfaces of the 3D sampling probe is redrawn "on the fly" so that the user perceives the image changing in real-time with movement of the 3D sampling probe. Similarly, as a user interactively moves a 3D sampling probe through a 3D volume data set, the 3D sampling probe is volume rendered with varying degrees of transparency "on the fly" so that the user perceives the image changing in real-time with movement of the 3D sampling probe.

It is a further feature of the present invention that a user can interactively change the shape or size of a 3D sampling probe so that the image on the surfaces of the 3D sampling probe is re-drawn "on the fly" so that the user perceives the image changing in real-time with the change in shape or size of the 3D sampling probe. Similarly, a user can interactively change the shape or size of a 3D sampling probe so that the 3D sampling probe is volume rendered with varying degrees of transparency "on the fly" so that the user perceives the image changing in real time with the change in shape or size of the 3D sampling probe.

It is yet a further feature of the present invention that a user can interactively rotate a 3D sampling probe so that the image on the surfaces of the 3D sampling probe is re-drawn "on the fly" so that the user perceives the image changing in real-time with the rotation of the 3D sampling probe. Similarly, a user can interactively rotate a 3D sampling probe so that the 3D sampling probe is volume rendered with varying degrees of transparency "on the fly" so that the user perceives the image changing in real-time with the rotation of the 3D sampling probe.

It is yet a further feature of the present invention that an eraser 3D sampling probe can be created and manipulated by the user to directly delete from an image selected points that fall within a certain data value range.

It is an advantage of the present invention that a user can manipulate a 3D sampling probe to interactively traverse a 3D volume data set to continuously follow and image a feature.

It is a further advantage of the present invention that a user can interactively change the displayed image in a continuous manner, without interruption or perceptible delay or lag. This allows a user to more quickly and accurately interpret and identify features inherent in 3D volume data sets.

It is yet a further advantage of the present invention that the 3D sampling probes can be interactively re-shaped by the user to match the shape of geologic features, thereby enabling the user to better visualize and define the extent of geologic features.

A still further advantage of the present invention is that it can be used to visualize and interpret large volumes of 3D seismic data. The present invention can be used to quickly and accurately identify drilling sites. The present invention can advantageously be used to sharply reduce 3D seismic project cycle times, to boost production from existing wells, and to locate additional reserves.

BRIEF DESCRIPTION OF THE FIGURES

The file of this patent contains at least one drawing executed in color. Copies of this patent with color drawings will be provided by the Patent and Trademark Office upon request and payment of the necessary fee.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Overview

Figure 1:
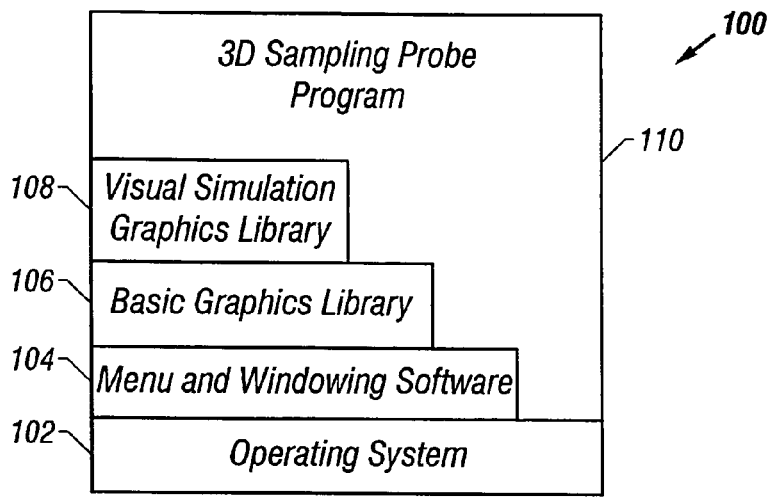
FIG. 1 shows one embodiment of a software or program structure for implementing the present invention.

The present invention is directed to a system and method for analyzing and imaging three-dimensional ("3D") volume data sets using a 3D sampling probe. 3D volume data sets comprise "voxels" or volume elements. Each voxel is a sample or point within a volume. Each voxel can be expressed in the form (x, y, z, data value) where "x, y, z" identifies the 3D location of the point within the volume, and "data value" is the value of some measured or calculated attribute or physical parameter at the specified point within the volume. For example, a 3D volume data set suitable for use with the present invention is 3D seismic data. Each voxel in a 3D seismic data can be expressed as (x, y, z, amplitude), with amplitude corresponding to the amplitude of reflected sound waves at the specified (x, y, z) location.

Any form of information that can be expressed in the voxel form (x, y, z, data value) is suitable for use with the present invention. In addition to seismic data, examples from the oil and gas industry include information from closely spaced well logs, gravity and magnetic fields, remote sensing data, and sidescan sonar image data. Other geologic or physical information could also include temperature, pressure, saturation, reflectivity, acoustical impedance, and velocity.

Another application for the present invention is for mining. For example, the present invention can be used to visualize and interpret geologic and geophysical data to locate mining sites, to locate and track deposits to be mined, or to locate and track geologic features such as faults that would affect mining operations. The present invention also has application for cleanup of toxic, hazardous, or other types of waste. For example, the present invention can be used to visualize and interpret data representing the geographic extent and distribution of the waste at a particular site. Such visualization and interpretation is useful for prioritizing clean-up at various sites, and for developing a clean-up plan for a particular site.

The present invention can also be used with information outside of the oil and gas industry. For example, the present invention can be used for analyzing and imaging in the medical field, where the data value element of the voxel is obtained from a CAT (computerized axial tomography) scanner or a magnetic resonance imaging (MRI) procedure.

By way of explanation and example, the present invention will be described in detail below using 3D seismic data as the 3D volume data set. It is to be understood, however, that the present invention is not limited in any way to use of 3D seismic data.

The present invention is particularly useful as a visualization tool for interpreting 3D seismic data. As used herein, the term "visualization" refers to the construction of a three-dimensional picture in the user's mind of physical or geologic features or physical parameters that are inherently present in 3D volume data sets. Such physical features or parameters are typically not apparent from conventional means of processing 3D data sets, such as scanning a series of cross-sections of the 3D volume data set, because of the mental reconstruction that needs to take place in order for a user to mentally "picture" the three-dimensional feature. Because of this mental reconstruction, it is difficult to communicate and share among users the same 3D image. For example, the same 3D mental image of the terrain will not necessarily be present in the mind of every person that reads or analyzes a two-dimensional ("2D") contour map of that terrain. Through the use of 3D computer graphics, users can visualize, and communicate and share, the same 3D image of 3D volume data sets. By visualizing 3D seismic data, a team of geologists, geophysicists, and engineers can interpret the visualized data to make exploration and production decisions, such as drilling locations and well paths.

To accomplish the visualization function, the present invention uses the computer graphics techniques of texture mapping and volume rendering. By "texture map" is meant wrapping or mapping a 2D picture or image onto a 2D or a 3D object. For example, a photograph of a person can be texture mapped onto a coffee cup.

The term "volume rendering" or "volume imaging" refers to drawing a three-dimensional object in a manner that conveys to a viewer the three-dimensional nature of the object, even though the viewer may be looking at a two-dimensional display or screen. Computer graphics technology makes use of coloring, lighting, and shading techniques to convey to the mind of the viewer what is high or low, behind or in front, light or dark, etc. The perspective or viewpoint can be changed so that the viewer can see all sides of the 3D object. Volume rendering typically includes some type of transparency/opacity (opacity=1-transparency) control so that certain parts of the 3D object are more transparent, thereby allowing a viewer to "see through" outer surfaces of an object and view its internal structures.

The present invention enables fast visualization and analysis of very large 3D volume data sets through the use of a "sampling probe", also referred to herein as a "probe" or "probe object". As explained in more detail below, the sampling probes of the present invention have numerous attributes, one of which is that they are typically created as a 3D sub-volume of the whole 3D volume data set to be visualized and analyzed.

A number of sampling probes can be created, shaped, sized, and moved interactively by the user within the whole 3D volume data set. The intersection of the sampling probe with the whole 3D volume data set is texture mapped onto the surfaces of the sampling probe, or volume rendered with varying degrees of transparency within the sampling probe. As used herein, the term "interactive" or "interactively" refers to changing or re-drawing an image in response to user input at a rate sufficiently fast that the user perceives an instantaneous or real-time change in the image, without perceptible delay or lag. In practice, a frame rate of at least about 10 to 15 frames per second is sufficient to achieve interactive imaging as described herein. For example, as the user moves the sampling probe, such as by "clicking and dragging" with a "mouse", the user perceives the texture on the surfaces of the sampling probe changing in "real-time" with movement of the sampling probe. As the sampling probe changes shape, size, or location, there is no user-perceivable delay or lag in imaging the texture, or, with varying degrees of transparency, volume-rendered attributes. In this manner, the user can interactively move the sampling probes through the whole 3D volume, and more easily and effectively visualize and interpret the features and physical parameters that are present within the geographic space represented by the whole 3D volume data set.

System Description

The present invention may be implemented using hardware, software or a combination thereof, and may be implemented in a computer system or other processing system. One embodiment of a software or program structure 100 for implementing the present invention is shown in FIG. 1. At the base of program structure 100 is an operating system 102. Suitable operating systems 102 include, for example, the UNIX@ operating system, or Windows NT@ from Microsoft Corporation, or other operating systems as would be apparent to one of skill in the relevant art.

Menu and windowing software 104 overlays operating system 102. Menu and windowing software 104 is used to provide various menus and windows to facilitate interaction with the user, and to obtain user input and instructions. Menu and windowing software 104 can include, for example, Microsoft Windows™, X Window System™ (registered trademark of Massachusetts Institute of Technology), and MOTIF™ (registered trademark of Open Software Foundation Inc.). As would be readily apparent to one of skill in the relevant art, other menu and windowing software could also be used.

A basic graphics library 106 overlays menu and windowing software 104. Basic graphics library 106 is an application programming interface (API) for 3D computer graphics. The functions performed by basic graphics library 106 include, for example, geometric and raster primitives, RGBA or color index mode, display list or immediate mode, viewing and modeling transfonnations, lighting and shading, hidden surface removal, alpha blending (translucency), anti-aliasing, texture mapping, atmospheric effects (fog, smoke, haze), feedback and selection, stencil planes, and accumulation buffer.

A particularly preferred basic graphics library 106 is OpenGL®, available from Silicon Graphics, Inc. ("SGI"), Mountain View, Calif. The OpenGL® API is a multi platform industry standard that is hardware, window, and operating system independent. OpenGL® is designed to be callable from C, C++, FORTRAN, Ada and Java programming languages. OpenGL® performs each of the functions listed above for basic graphics library 106. Some commands in OpenGL® specify geometric objects to be drawn, and others control how the objects are handled. All elements of the OpenGL® state, even the contents of the texture memory and the frame buffer, can be obtained by a client application using OpenGL®, OpenGL® and the client application may operate on the same or different machines because OpenGL® is network transparent. OpenGL® is described in more detail in the OpenGL® Programming Guide (ISBN: 0-201-63274-8) and the OpenGL® Reference Manual (ISBN: 0-201-63276-4), the entirety of both of which are incorporated herein by reference.

Visual simulation graphics library 108 overlays basic graphics library 106. Visual simulation graphics library 108 is an API for creating real-time, multi-processed 3D visual simulation graphics applications. Visual simulation graphics library 108 provides functions that bundle together graphics library state control functions such as lighting, materials, texture, and transparency. These functions track state and the creation of display lists that can be rendered later.

A particularly preferred visual simulation graphics library 108. is IRIS Performer, available from SGI in Mountain View, Calif. IRIS Performer supports the OpenGL® graphics library discussed above. IRIS Performer includes two main libraries, libpf and libpr, and four associated libraries, libpfdu, libpfdb, libpfui, and libpfutil.

The basis of IRIS Performer is the performance rendering library libpr, a low-level library providing high speed rendering functions based on GeoSets and graphics state control using GeoStates. GeoSets are collections of drawable geometry that group same-type graphics primitives (e.g., triangles or quads) into one data object. The GeoSet contains no geometry itself, only pointers to data arrays and index arrays. Because all the primitives in a GeoSet are of the same type and have the same attributes, rendering of most databases is performed at maximum hardware speed. GeoStates provide graphics state definitions (e.g., texture or material) for GeoSets.

Layered above libpr is libpf, a real-time visual simulation environment providing a high-performance multi-process database rendering system that optimizes use of multiprocessing hardware. The database utility library, libpfdu, provides functions for defining both geometric and appearance attributes of 3D objects, shares state and materials, and generates triangle strips from independent polygonal input. The database library libpfdb uses the facilities of libpfdu, libpf, and libpr to import database files in a number of industry standard database formats. The libpfui is a user interface library that provides building blocks for writing manipulation components for user interfaces (C and C++ programming languages). Finally, the libpfutil is the utility library that provides routines for implementing tasks such as MultiChannel Option support and graphical user interface (GUI) tools.

An application program that uses IRIS Performer and OpenGL® API typically carry out the following steps in preparing for real-time 3D visual simulation.

1. Initialize IRIS Performer.
2. Specify number of graphics pipelines, choose the multiprocessing configuration, and specify hardware mode as needed.
3. Initialize chosen multiprocessing mode.
4. Initialize frame rate and set frame-extend policy.
5. Create, configure, and open windows as required.
6. Create and configure display channels as required.

Once the application program has created a graphical rendering environment by carrying out steps 1 through 6 above, then the application program typically iterates through a main simulation loop once per frame.

7. Compute dynamics, update model matrices, etc.
8. Delay until the next frame time.
9. Perform latency critical viewpoint updates.
10. Draw a frame.

A 3D sampling probe program 110 of the present inventions overlays visual simulation graphics library 108. Program 110 interacts with, and uses the functions carried out by, each of visual simulation and graphics library 108, basic graphics library 106, menu and windowing software 104, and operating system 102 in a manner known to one of skill in the relevant art.

3D sampling probe program 110 of the present invention is preferably written in an object oriented programming language to allow the creation and use of objects and object functionality. A particularly preferred object oriented programming language is C++. In carrying out the present invention, program 110 creates one or more probe "objects". As noted above, the probe objects created and used by program 110 are also referred to herein as sampling probes or probes. Program 110 manipulates the probe objects so that they have the following attributes.

A probe corresponds to a sub-volume of a larger 3D volume. Particularly, a probe defines a sub-set that is less than the complete data set of voxels for a 3D volume data set. A probe could be configured to be equal to or coextensive with the complete data set of voxels for a 3D volume data set, but the functionality of the present invention is best carried out when the probe corresponds to a sub-volume and defines a sub-set that is less than the complete data set of voxels for a 3D volume data set. For example, a 3D volume data set of seismic data can contain from about 500 ME (megabytes) to about 10 GB (gigabytes) or more of data. A 2,500 square kilometer geographic space of typical 3D seismic data contains about 8 GB of data. A probe of the present invention for a 500 ME seismic data set would preferably contain about 10–20 ME of data.

By using probes that are a sub-volume of the larger 3D volume, the quantity of data that must be processed and re-drawn for each frame of an image is dramatically reduced, thereby increasing the speed with which the image can be re-drawn. The volume of a three-dimensional cube is proportional to the third power or "cube" of the dimensions of the three-dimensional cube. Likewise, the quantity of data in a 3D volume data set is proportional to the third power or "cube" of its size. Therefore, the quantity of data in a sub-volume of a larger 3D volume will be proportional to the "cubed root" ($\sqrt[3]{}$) of the quantity of data in the larger 3D volume. As such, the quantity of data in a probe of the present invention will be proportional to the "cubed root" ($\sqrt[3]{}$) of the quantity of data in the 3D volume of which it is a sub-volume. By only having to process the sub-set of data that relates to the sub-volume of the probe, the present invention can re-draw an image in response to user input at a rate sufficiently fast that the user perceives an instantaneous or real-time change in the image, without perceptible delay or lag.

The probes of the present invention can be interactively changed in shape and/or size, and interactively moved within the larger 3D volume. The outside geometry or surfaces of a probe can be interactively drawn opaque or texture mapped while the probe is being changed in shape and/or size or while the probe is being moved. The probe can be drawn or volume rendered with varying degrees of transparency while the probe is being changed in shape and/or size or moved, thereby revealing the internal structures or features of the probe.

The 3D sampling probes of the present invention can have any shape, including rectangular shapes having one or more right angles and non-rectangular shapes having no right angles. The 3D sampling probes of the present invention can have orthogonal or perpendicular planes as outer surfaces (e.g., squares and rectangles), parallel planes as outer surfaces (e.g., parallelograms), or curved outer surfaces (e.g., spheres, ovals, or cylinders). The present invention is not limited to 3D sampling probes of any particular shape. The 3D sampling probes of the present invention can have arbitrary shapes, such as the shape of a geologic feature identified by a user. For example, as a user moves the 3D sampling probe through a 3D volume of seismic data, a geologic feature may be visualized and identified by the user. The 3D sampling probe can be interactively re-shaped by the user to match the shape of the geologic feature, thereby enabling the user to better visualize and define the extent of that geologic feature.

A probe can be used to cut into another probe, and the intersection of the two probes can be imaged. A probe can be used to highlight data in accordance with a seed selection algorithm. A probe can also be used to "erase" or delete data in accordance with a seed de-selection algorithm. These attributes will be explained in more detail below.

Figure 2:
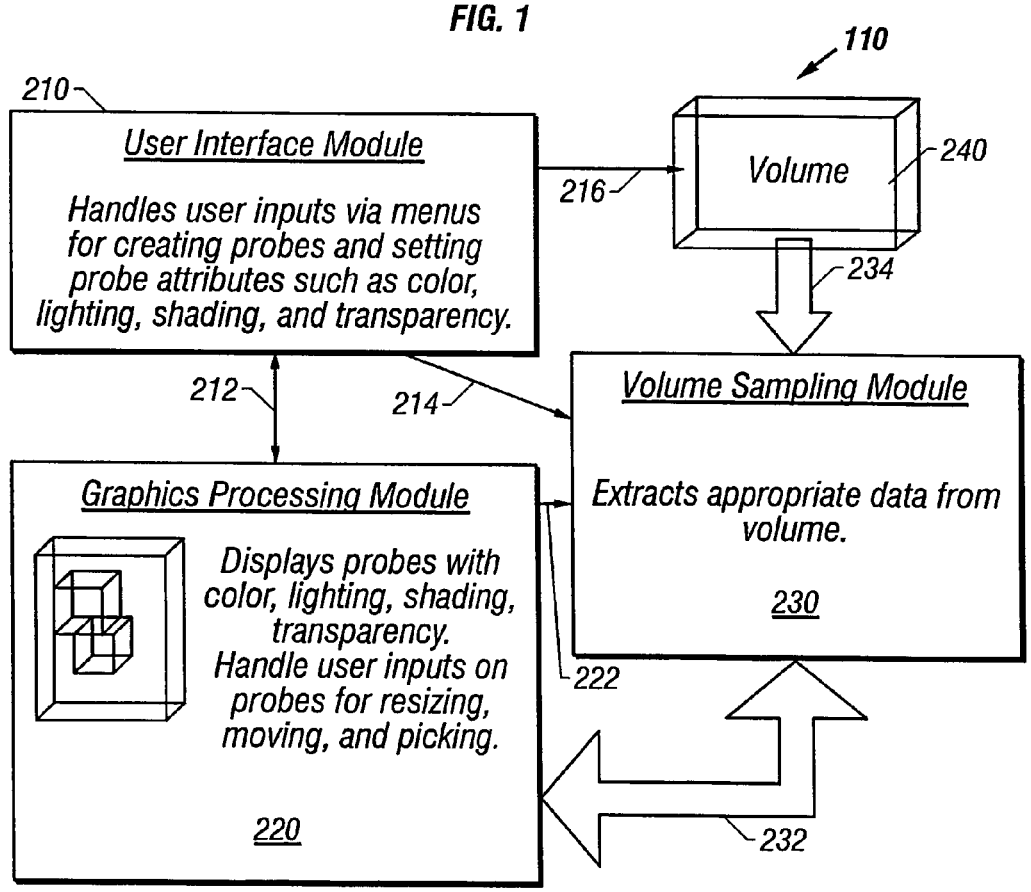
FIG. 2 shows a block diagram of one embodiment of the 3D sampling probe program of the present invention.

FIG. 2 shows a block diagram of one embodiment of 3D sampling probe program 110. Program 110 includes a User Interface Module (UIM) 210, a Graphics Processing Module (GPM) 220, and a Volume Sampling Module (VSM) 230. A 3D volume data set is illustrated as data volume 240, also referred to herein as a 3D volume. UIM 210 and GPM 220 communicate via a bi-directional pathway 212. GPM 220 sends instructions and requests for data to VSM 230 via pathway 222. UIM 210 sends instructions and requests to VSM 230 via pathway 214. UIM 210 interacts with data volume 240 through pathway 216.

Voxel data from data volume 240 is transferred to VSM 230 via data pathway 234. VSM 230 transfers data to GPM 220 via data pathway 232. Data volume 240 stores the 3D volume data set in a manner well known to one of skill in the relevant art. For example, the format for data volume 240 can consist of two parts, a volume header followed by the body of data that is as long as the size of the data set. The volume header typically contains information, in a prescribed sequence, such as the file path (location) of the data set, size, dimensions in the x, y, and z directions, annotations for the x, y, and z axes, annotations for the data value, etc. The body of data is a binary sequence of bytes; one or more bytes per data value, that can be ordered in the following manner. The first byte is the data value at volume location (x, y, z)=(0,0,0). The second byte is the data value at volume location (1,0,0), the third byte is the data value at volume location (2,0,0), etc. When the x dimension is exhausted, then the y dimension is incremented, and finally the z dimension is incremented. The present invention is not limited in any way to a particular data format for data volume 240.

User Interface Module 210 handles the user interface to receive commands, instructions, and input data from the user. UIM 210 interfaces with the user through a variety of menus through which the user can select various options and settings, either through keyboard selection or through one or more user-manipulated input devices, such as a "mouse," or a 3D pointing device. UIM 210 receives user input as the user manipulates the input device to move, size, shape, etc. a 3D sampling probe.

The primary functions carried out by UIM 210 will now be described. UIM 210 inputs from the user the identification of one or more 3D volume data sets (represented by data volume 240) to use for imaging and analysis. When a plurality of data volumes are used, the data value for each of the plurality of data volumes represents a different physical parameter or attribute for the same geographic space. By way of example, a plurality of data volumes could include a geology volume, a temperature volume, and a water-saturation volume. The voxels in the geology volume can be expressed in the form (x, y, z, seismic amplitude). The voxels in the temperature volume can be expressed in the form (x, y, z, Qq. The voxels in the water-saturation volume can be expressed in the form (x, y, z, % saturation). The physical or geographic space defined by the voxels in each of these volumes is the same. However, for any specific spatial location (xo. yo, zo), the seismic amplitude would be contained in the geology volume, the temperature in the temperature volume, and the water-saturation in the water-saturation volume.

Figure 3:
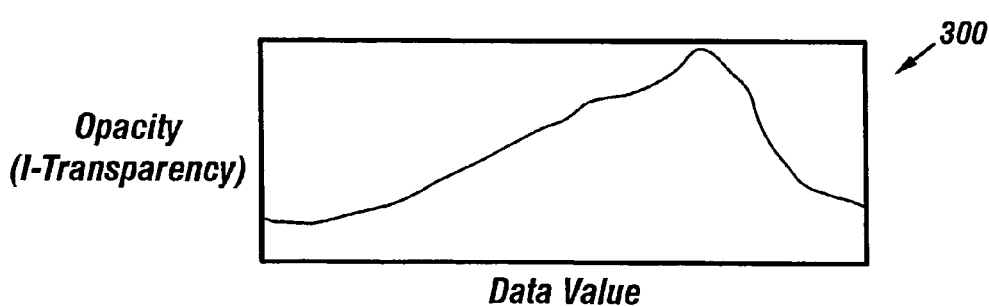
FIG. 3 shows a curve illustrating opacity as a function of data value.

UIM 210 inputs from the user information to create one or more 3D sampling probes. Such information includes size, shape, and initial location of the probe. Such information can also include imaging attributes such as color, lighting, shading, and transparency (or opacity). By adjusting opacity as a function of data value, certain portions of the data volume are more transparent, thereby allowing a viewer to see through surfaces. An exemplary opacity curve 300 is shown in FIG. 3. Opacity curve 300 illustrates opacity (I-transparency) as a function of data value. As would be readily apparent to one skilled in the art, data values with greater opacity (less transparency) will mask the imaging or display of data values with lower opacity (more transparency). Conversely, data values will less opacity and greater transparency will permit the imaging or display of data values with greater opacity and lower transparency.

UIM 210 receives input from the user for sizing and shaping the 3D sampling probes. As described in more detail below, in a preferred embodiment of the present invention, the user changes the shape and/or size of a probe by clicking onto "sizing tabs" on the probe, and making changes in the dimensions of the probe in one or more directions. UIM 210 receives input from the user to move the position or location of a 3D sampling probe within the data volume. In a preferred embodiment, a user manipulates a mouse to "click" onto a surface of the probe to be moved, and then moves the mouse to move the probe throughout the geographic space defined by the data volume.

UIM 210 receives input from the user to carry out "auto picking" processes. In an auto picking process, data points (voxels) are selected based upon a selection algorithm. In a preferred embodiment, the selection algorithm is based upon a seed point within the 3D data volume. The selection algorithm then selects data points that: (i) satisfy the selection criteria or algorithm (e.g., have a data value within a specified filter range); and (ii) have a connectivity with or are connected to the seed point. Through UIM 210, the user is prompted to identify a seed point within the 3D volume, and to identify a filter range of data values used by the selection algorithm to "pick" the selected points. Preferably, the seed point is within one of the 3D sampling probes.

UIM 210 also receives input from the user regarding the content of the displayed image. For example, the user can preferably select the content of the displayed image. The content of the displayed image could include only the 3D sampling probe, i.e., its intersection with the 3D volume. Additionally, the 3D sampling probe could be displayed either with or without a bounding box that defines the outer geometry of the probe. Alternatively, the displayed image could include the 3D sampling probe, as well as the data that occupies the background xz, yz, and xy planes, and/or the data occupies the 3D volume outside of the 3D sampling probe(s) being displayed.

To carry out the foregoing functions, UIM 210 sends a request to Volume Sampling Module 230 to load or attach those 3D volume data sets identified by the user. UIM 210 communicates via pathway 212 with Graphics Processing Module 220 that carries out the display and imaging.

The primary functions carried out by GPM 220 will now be described. GPM 220 processes data for imaging of 3D sampling probes with the color, lighting, shading, transparency, and other attributes selected by the user. To do so, GPM 220 uses the functions available through basic graphics library 106 and visual simulation graphics library 108 described above. The user can select (through UIM 210) to display only the one or more 3D sampling probes that have been created. Alternatively, the user can select to display one or more 3D sampling probes, as well as the 3D data volume outside of the probes, i.e. voxels within the 3D volume that do not intersect any of the 3D sampling probes that are being displayed. 3D sampling probes that are being displayed are referred to herein as "active probes".

GPM 220 processes the re-shaping and move requests that are received by UIM 210 from the user. GPM 220 draws the re-shaped 3D sampling probe in accordance with the user-selected attributes (color, lighting, shading, transparency, etc.). As the user inputs a change in shape for a 3D sampling probe, the image with selected attributes is re-drawn sufficiently fast to be perceived as real-time by the user. Similarly, GPM 220 draws the 3D sampling probe in the new position or location in accordance with the user-selected attributes (color, lighting, shading, transparency, etc.). As the user moves the 3D sampling probe through the 3D volume, the image of the 3D sampling probe with selected attributes is re-drawn sufficiently fast to be perceived as real-time by the user.

GPM 220 processes "auto picking" requests that are received by UIM 210. GPM 220 will image selected points within the 3D volume in accordance with the selection algorithm. Alternatively, GPM 220 will "erase" selected points within the 3D volume in accordance with the selection algorithm.

To carry out the foregoing functions, GPM 220 communicates via pathway 212 with UIM 210 so that the information requested by the user is imaged or displayed with the selected attributes. GPM 220 obtains the needed data from data volume 240 by sending a data request via pathway 222 to Volume Sampling Module (VSM) 230.

The primary function of VSM 230 is to extract the appropriate data from data volume 240 at the request of GPM 220. VSM 230 receives requests for data from GPM 220 via pathway 222. VSM 230 extracts the required data from data volume 240 and transfers the data to GPM 220 via data pathway 232 for processing and display. VSM 230 also receives instructions from UIM 210 via pathway 214 to load or attach the 3D data volumes identified by the user.

Figure 4:
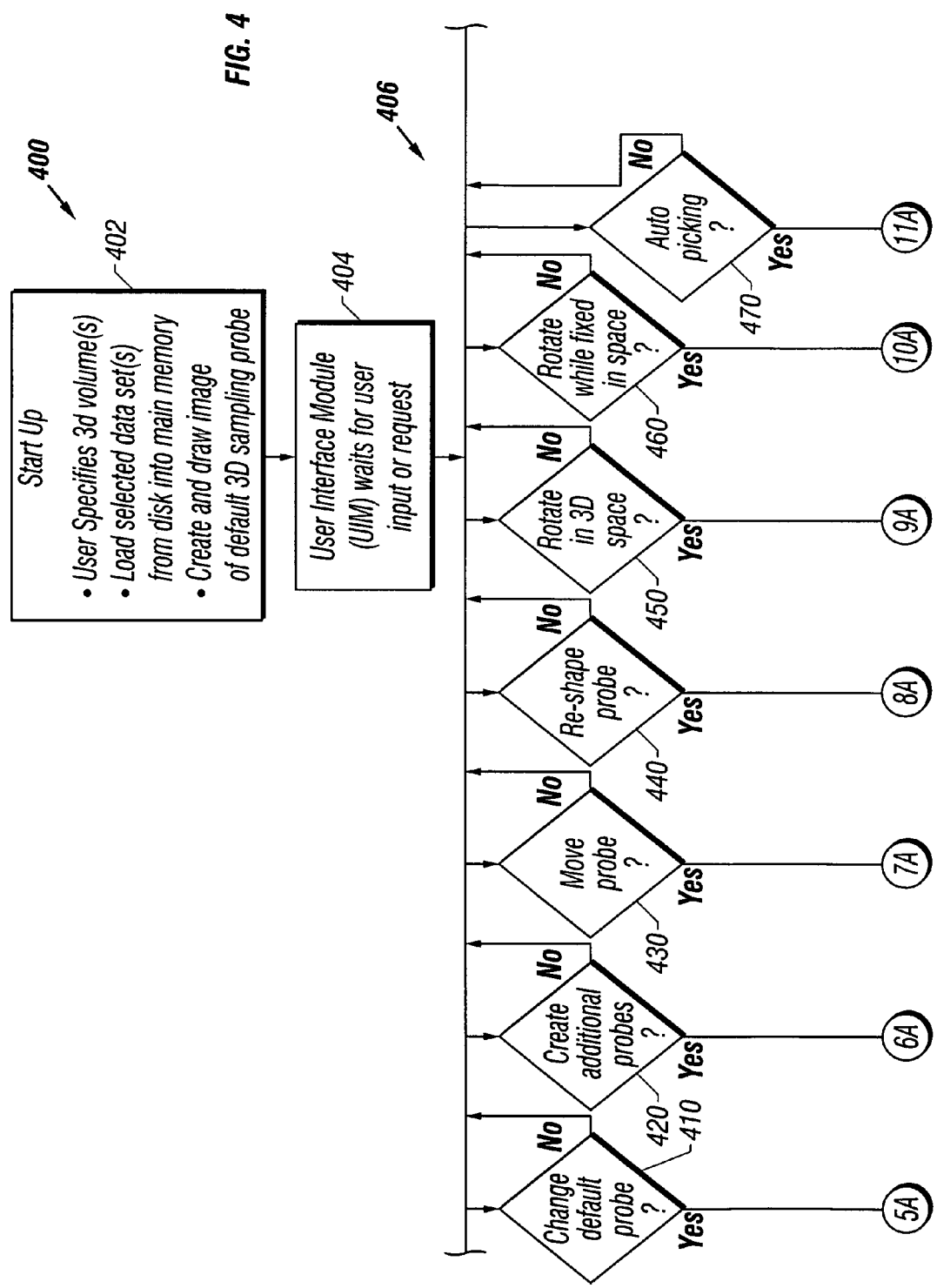
FIG. 4 shows a flow diagram illustrating one embodiment for implementing the present invention.

Turning now to FIG. 4, a flow diagram 400 illustrating one embodiment for implementing the present invention is shown. A start up or initialization process is shown in a step 402. In step 402, the user specifies the one or more data volumes (240) to be used. The specified 3D volume data sets are loaded from disk into main memory (a description of hardware suitable for carrying out the present invention will be described in more detail below). A default 3D sampling probe is created, and drawn. The default 3D sampling probe is a sub-volume of the specified 3D volume(s) of arbitrary size and shape. The present invention is not limited to any particular size or shape for the default 3D sampling probe.

By way of example of the present invention, the default 3D sampling probe can be a square (having equal dimensions in the x, y, and z directions). To draw the square default 3D sampling probe, the bounding geometry is first drawn with one edge of the bounding geometry located on the z axis. Data is then extracted from data volume 240 by VSM 230 to draw the image of the intersection of the square default 3D sampling probe with the 3D volume (data volume 240). Particularly, data is extracted that corresponds to the intersection of the square default 3D sampling probe with the 3D volume in the xz, yz, and xy planes. This data is then sent by VSM 230 to GPM 220 so that it can be texture mapped onto the planes of the bounding box to provide an image of the square default 3D sampling probe.

In one embodiment of the present invention, the data that occupies the background xz, yz, and xy planes themselves, as well as the data that occupies the 3D volume outside of the default 3D sampling probe, are also imaged or displayed (in addition to the default 3D sampling probe) during start up step 402. Alternatively, start up step 402 can be carried out so that the data that occupies the background xz, yz, and xy planes, or the data that occupies the 3D volume outside of the default 3D sampling probe, is not displayed or imaged. Preferably, the present invention is carried out so that the user can selectively display, or not display, the data that occupies the background xz, yz, and xy planes, as well as the data that occupies the 3D volume outside of the active probes.

In a step 404, UIM 210 is waiting to respond to user input or request. User input is received through a user input device suitable for use with a computer, including but not limited to, a keyboard, mouse, joystick, trackball, rollerball, roller point, or other type of suitable pointing device, etc. Preferably, the user input device comprises a mouse or other similar device that enables the user to "click" on a particular displayed image, and "drag" that displayed image to another location. Such a user input device allows a user to move and re-shape displayed probes. Such a user input device also allows a user to activate drop-down menus, and to select the various options for the color, shading, lighting, and transparency attributes. A keyboard can also be used for entering information relating to the selected attributes.

Reference numeral 406 refers generally to a plurality of functions that can be carried out by the present invention. These functions can be carried out individually or simultaneously, depending upon input from the user. For example, a probe can be moved (function 430) and rotated (function 450) simultaneously. While the functions identified by reference numeral 406 are being carried out, the image of the 3D sampling probes is being re-drawn sufficiently fast to be perceived as real-time by the user. Each of the functions identified by reference numeral 406 will now be described.

Figure 5:
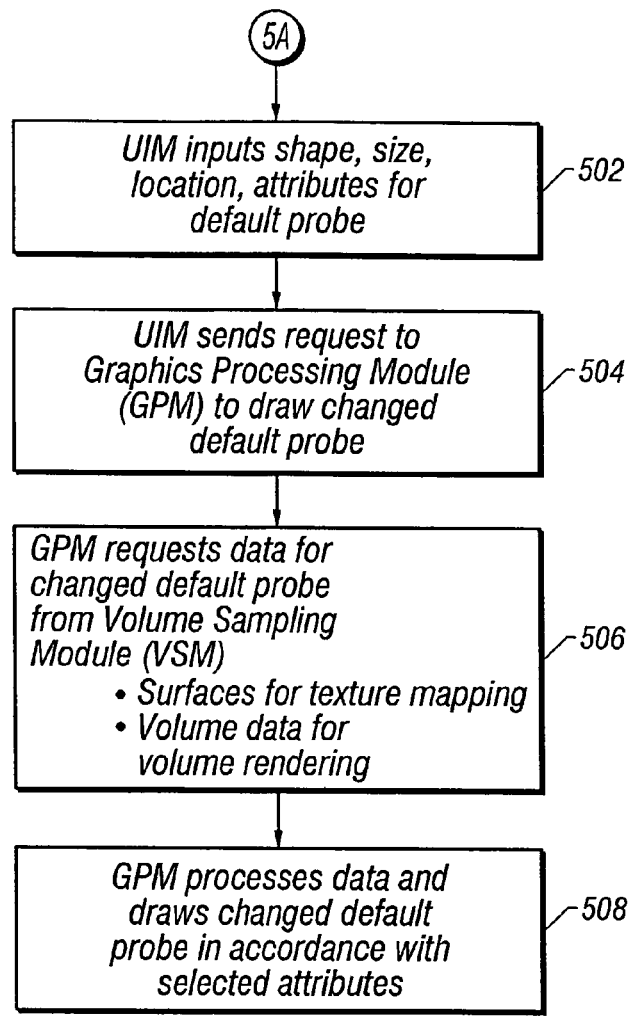
FIG. 5 shows a flow diagram of one embodiment for changing a default probe.

If a user wants to change the default probe, then function 410 is carried out. The steps for carrying out function 410 are shown in FIG. 5 by way of flow diagram connector 5A. In a step 502, the changes to the default probe are input by UIM 210 from the user. For example, the changes to the default probe can be to the shape or size, the location, or the attributes such as color, shading, lighting, and transparency.

In a step 504, UIM 210 sends a request to GPM 220 to draw the changed default probe. In a step 506, GPM 220 requests data for the changed default probe from VSM 230. In making this request, GPM 220 would invoke function 430 if it was necessary to move the default probe, function 440 to re-shape the default probe, and functions 450 or 460 to rotate the default probe. The foregoing functions will be described in more detail below.

The data that will be extracted from data volume 240 by VSM 230 in response to the request made by GPM 220 in step 506 will depend upon attributes that have been selected by the user. If the opacity settings selected by the user are such that all data values are opaque, then the data extracted by VSM 230 will be limited to the surfaces of the changed default probe. Because of the selected opacity, it will not be possible for the user to see inside the changed default probe, so only the data corresponding to the surfaces or outside of the changed default probe will be extracted by VSM 230. In a step 508, GPM 220 processes the data extracted by VSM 230 for the surfaces of the changed default probe, and draws the changed default probe by texture mapping onto the surfaces in accordance with the attributes selected by the user. By extracting only the data that can be seen by the user, the image of the changed default probe can be drawn more quickly because less data needs to be processed, i.e., the data corresponding to the "inside" of the changed default probe is not processed.

Alternatively, if the opacity settings selected by the user are such that some of the data values are opaque and some of the data values are transparent, then the data extracted by VSM 230 will include the data corresponding to the entire volume of the changed default probe. Because of the selected opacity and transparency, it will be possible for the user to see inside the changed default probe, so data corresponding to the entire volume of the changed default probe will be extracted by VSM 230. In such a situation, GPM 220 processes the data extracted by VSM 230 in step 508, and draws the changed default probe by volume rendering in accordance with the attributes selected by the user.

Figure 6:
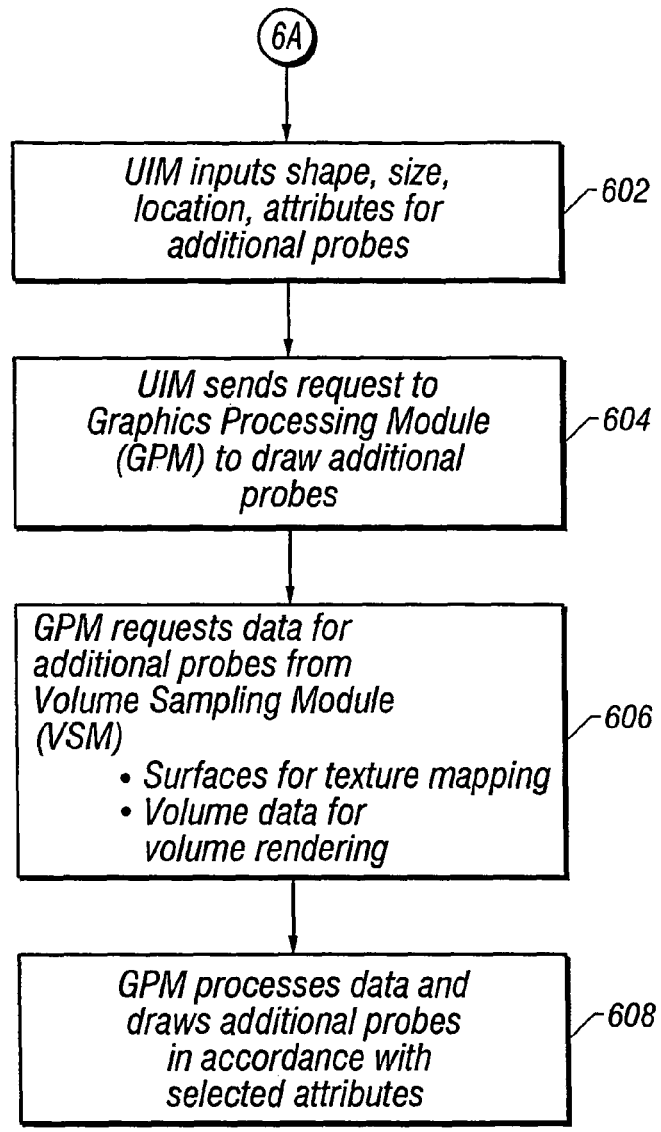
FIG. 6 shows a flow diagram of one embodiment for creating additional probes.

If a user wants to create additional probes, then function 420 is carried out. The present invention is not limited to any particular number of active probes. The steps for carrying out function 420 are shown in FIG. 6 by way of flow diagram connector 6A. In a step 602, the shape, size, location, attributes, etc. for the additional probes are input by UIM 210 from the user. In a step 604, UIM 210 sends a request to GPM 220 to draw the additional probes.

In a step 606, GPM 220 requests data for the additional probes from VSM 230. In a manner similar to that described above for changing the default probe, the data that is extracted from 3D or data volume 240 by VSM 230 will depend upon the opacity selected by the user for the additional probes. If the opacity settings selected by the user are such that all data values for the additional probes are opaque, then the data extracted by VSM 230 will be limited to the surfaces of the additional probes. Alternatively, if the opacity settings selected by the user for the additional probes are such that some of the data values are opaque and some of the data values are transparent, then the data extracted by VSM 230 will include the data corresponding to the entire volumes of the additional probes. In this manner, the additional probes can be drawn more quickly by minimizing the quantity of data that must be processed.

In a step 608, GPM 220 processes the data extracted by VSM 230 for the additional probes, and draws the additional probes in accordance with the attributes selected by the user, either by texture mapping onto the surfaces of the additional probes, or by volume rendering the entire volume of the additional probes.

Figure 7:
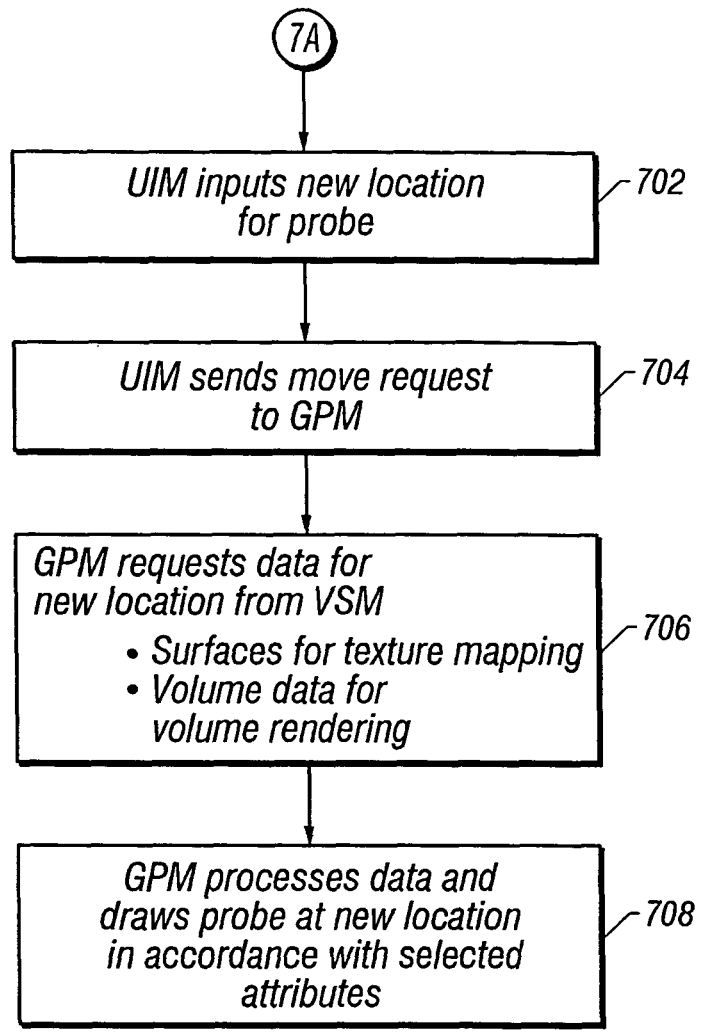
FIG. 7 shows a flow diagram of one embodiment for moving a probe.

If a user wants to move a probe, then function 430 is carried out. The steps for carrying out function 430 are shown in FIG. 7 by way of flow diagram connector 7A. In a step 702, the new location for the probe is input by UIM 210 from the user. In a preferred embodiment of the present invention, the user inputs the new location of the probe by clicking a mouse or other type of suitable user input device to snap a pointer onto a surface of the probe to be moved. The user changes the location of the probe by moving the mouse or other suitable user input device in any direction, thereby dragging the probe along a trajectory.

In a step 704, UIM 210 sends a move request to GPM 220 to draw the probe at the new location. GPM 220 requests data for the new location of the probe from VSM 230. In a manner similar to that described above, the data that is extracted from data volume 240 by VSM 230 will depend upon the opacity selected by the user for the probe being moved. If the opacity settings selected by the user are such that all data values for the probe being moved are opaque, then the data extracted by VSM 230 will be limited to the surfaces of the probe being moved. Alternatively, if the opacity settings selected by the user for the probe being moved are such that some of the data values are opaque and some of the data values are transparent, then the data extracted by VSM 230 will include the data corresponding to the entire volume of the probe being moved. In this manner, the probe can be drawn at its new location more quickly by minimizing the quantity of data that must be processed.

In a step 708, GPM 220 processes the data extracted by VSM 230 for the probe being moved, and draws the probe at its new location in accordance with the attributes selected by the user, either by texture mapping onto the surfaces of the probe being moved, or by volume rendering the entire volume of the probe being moved.

As the user moves the probe, for each new location of the probe, steps 702 through 708 are repeated at a rate sufficiently fast that the user perceives the image of the probe, with texture mapping or volume rendering as appropriate, changing in "real-time" with movement of the probe. The image is being re-drawn at a frame rate sufficiently fast to be perceived as real-time by the user.

If a user wants to re-shape a probe, then function 440 is carried out. As used herein, the term "re-shape" refers to any change in dimension of a 3D sampling probe in any direction. The shape of a 3D sampling probe can be changed, or re-shaped, for example, by changing the size in one or more directions, such as by changing a square probe into a rectangular probe by increasing the size of the probe in the x direction, and decreasing the size of the probe in the y direction. As another example, the shape of a 3D sampling probe can be changed by changing the shape from spherical to rectangular. As yet another example, a square 3D sampling probe (equal dimensions in the x, y, and z directions) can be re-shaped in accordance with the present invention to be a larger or smaller square-shaped probe by changing the size equally in each of the x, y, and z directions. The re-shaped probe also has a square shape, but as a larger or smaller square.

Figure 8:
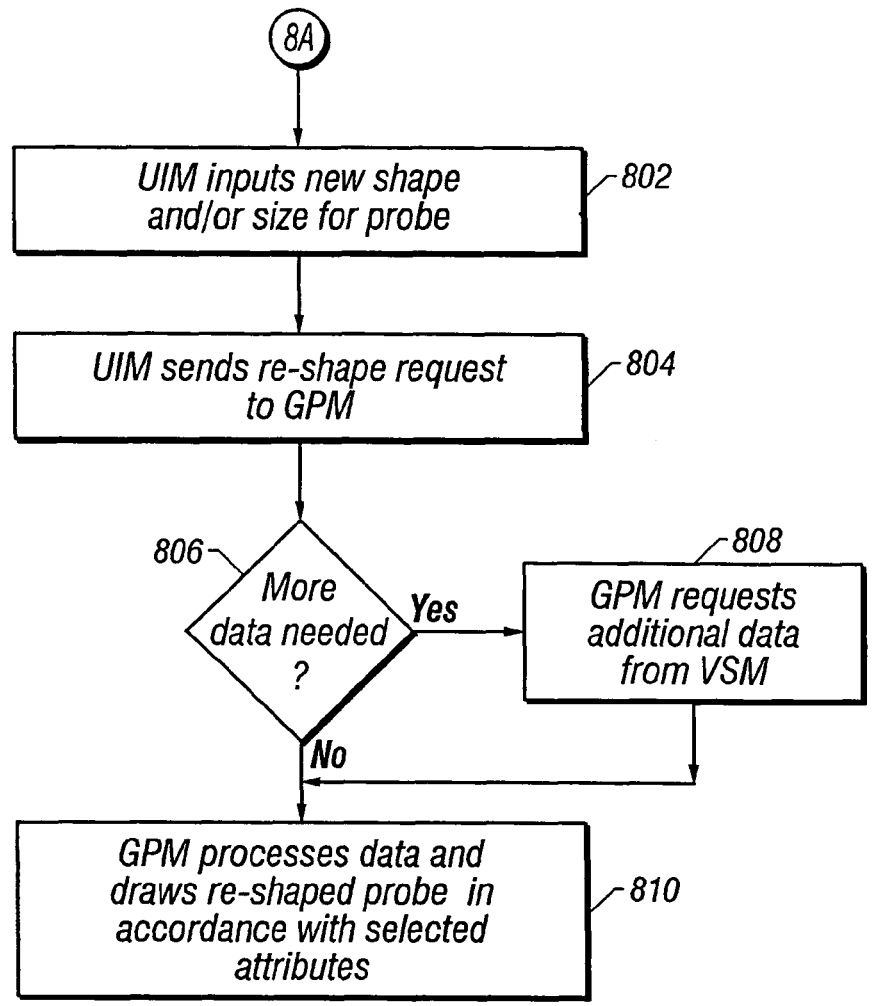
FIG. 8 shows a flow diagram of one embodiment for re-shaping a probe.
Figure 15:
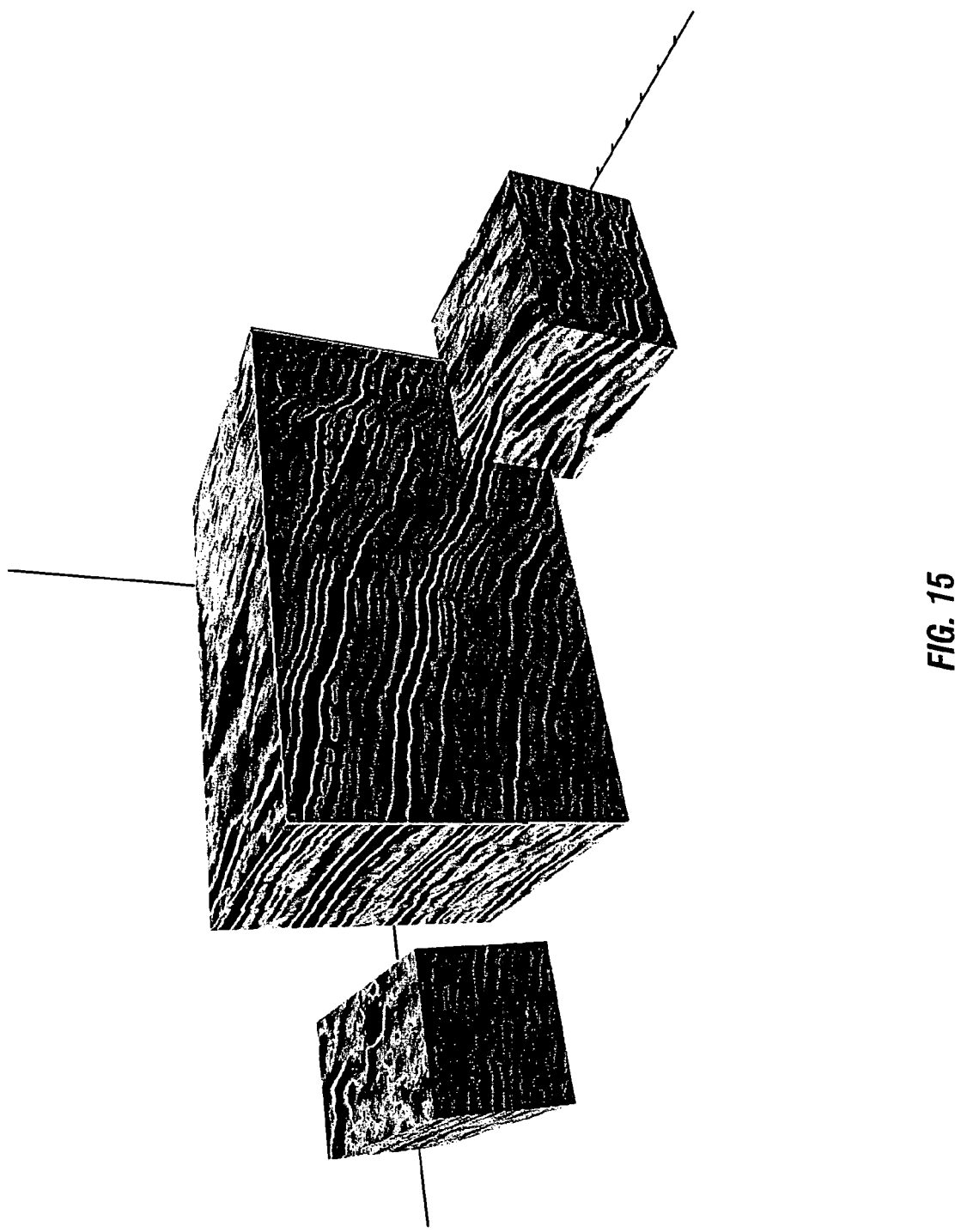
FIG. 15 shows a color drawing illustrating three opaque probes of the present invention, with two of the probes intersecting each other.
Figure 16:
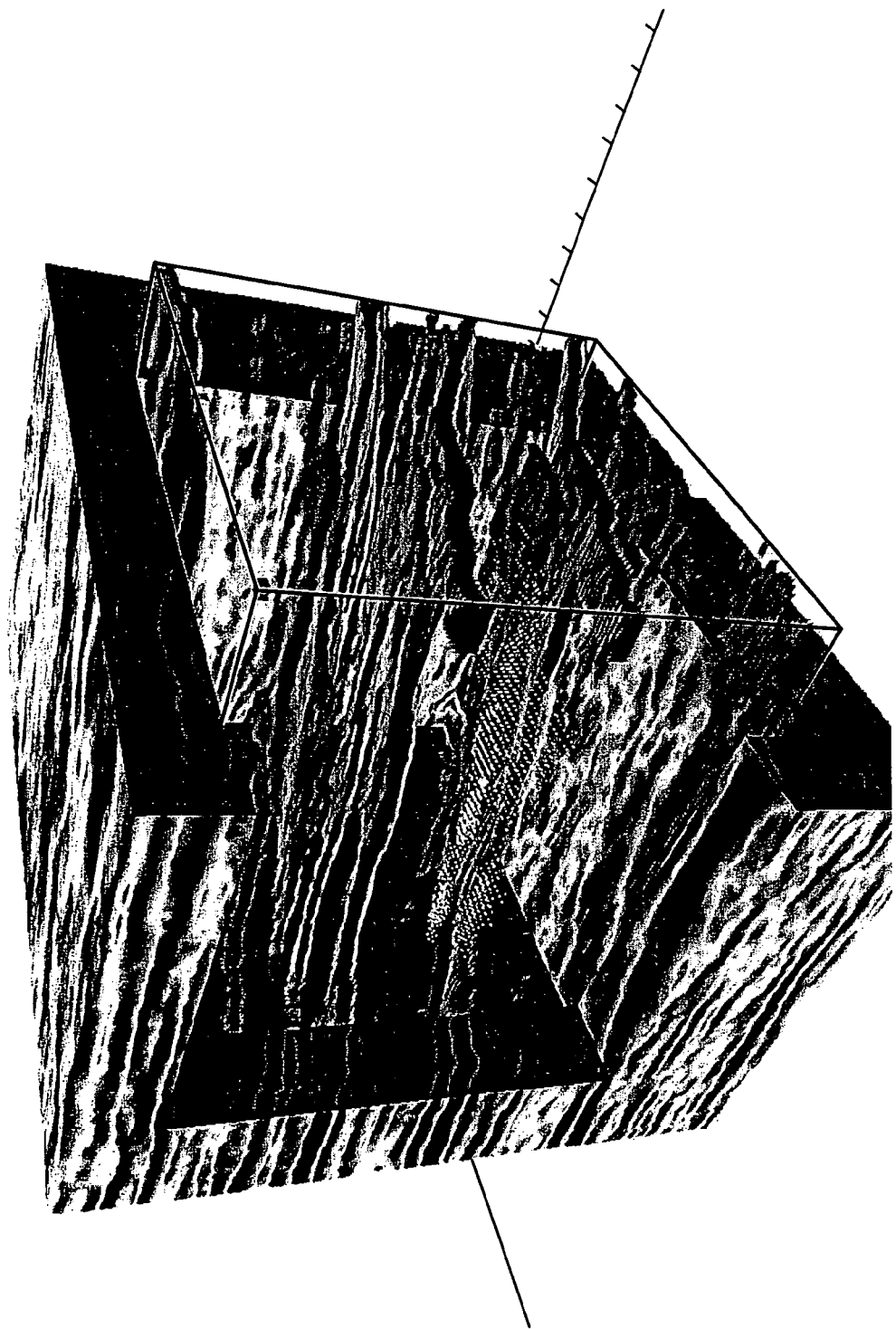
FIG. 16 shows a color drawing illustrating three probes of the present invention, a data probe, a transparent cut probe, and a volume-rendered probe.

The steps for carrying out function 440 are shown in FIG. 8 by way of flow diagram connector 8A. In a step 802, the new shape and/or size for the probe is input by UIM 210 from the user. In a preferred embodiment of the present invention, the user inputs the new shape of a probe by clicking a mouse or other type of suitable user input device to snap a pointer onto a "sizing tab" of the probe to be re-shaped. As used herein, a "sizing tab" refers to a designated area on a surface of the probe. Such a designated area is preferably displayed in a color that is different from the colors being used to display the features or physical parameters of the 3D, volume data set. When the pointer is snapped to the sizing tab, manipulation of the mouse or user input device changes the dimensions or proportions of the surface on which the sizing tab is located. When the desired size or shape is reached, the user again clicks the mouse or user input device to release the pointer from the sizing tab. Sizing tabs are illustrated in FIGS. 15 and 16. The sizing tabs are the small green squares that appear on the surfaces of the probes, along the bounding geometry of the probes. The location of the sizing tabs is not limited to the bounding geometry of the probes. The user changes the shape of the probe by clicking the mouse or other suitable user input device onto a sizing tab, moving the mouse until the surface being changed has the desired shape, and then releasing the mouse from the sizing tab. This process can be repeated, if necessary, using other sizing tabs on the probe until the probe is re:-shaped to the desired shape.

It would be readily apparent to one of skill in the relevant art how to implement such a sizing tab for re-shaping the probes of the present invention. It is to be understood, however, that the present invention is not limited to the use of sizing tabs for re-shaping probes, and other suitable methods can be used. For example, the user could select from a number of pre-set shapes (e.g., squares, rectangle, cylinders, spheres) by activating a drop-down menu, or by scrolling through the shapes by repeatedly clicking a mouse.

In a step 804, UIM 210 sends a re-shape request to GPM 220 to draw the re-shaped probe. In a step 806, it is determined whether more data is needed to draw the re-shaped probe. For example, if the re-shaped probe is of a shape and size that "fits inside" the existing probe, then no more data is needed, and processing continues at a step 810. Alternatively, if the reshaped probe is of a shape and size that falls at least partially outside of the existing probe, then, in a step 808, GPM 220 requests the data needed for the re-shaped probe from VSM 230. In a manner similar to that described above, the data that is extracted from 3D or data volume 240 by VSM 230 will depend upon the opacity selected by the user for the probe being re-shaped. If the opacity settings selected by the user are such that all data values for the probe being re-shaped are opaque, then the data extracted by VSM 230 will be limited to the surfaces of the probe being re-shaped. Alternatively, if the opacity settings selected by the user for the probe being re-shaped are such that some of the data values are opaque and some of the data values are transparent, then the data extracted by VSM 230 will include the data corresponding to the entire volume of the probe being re-shaped. In this manner, the probe can be drawn with its new shape more quickly by minimizing the quantity of data that must be processed.

In step 810, GPM 220 processes the data extracted by VSM 230 for the probe being re-shaped, and draws the probe with its new shape in accordance with the attributes selected by the user, either by texture mapping onto the surfaces of the probe being re-shaped, or by volume rendering the entire volume of the probe being re-shaped.

As the user changes the shape of the probe, steps 802 through 810 are repeated at a rate sufficiently fast that the user perceives the image of the probe, with texture mapping or volume rendering as appropriate, changing in "real-time" with the changing shape of the probe. The image is being re-drawn at a frame rate sufficiently fast to be perceived as real-time by the user.

Figure 9:
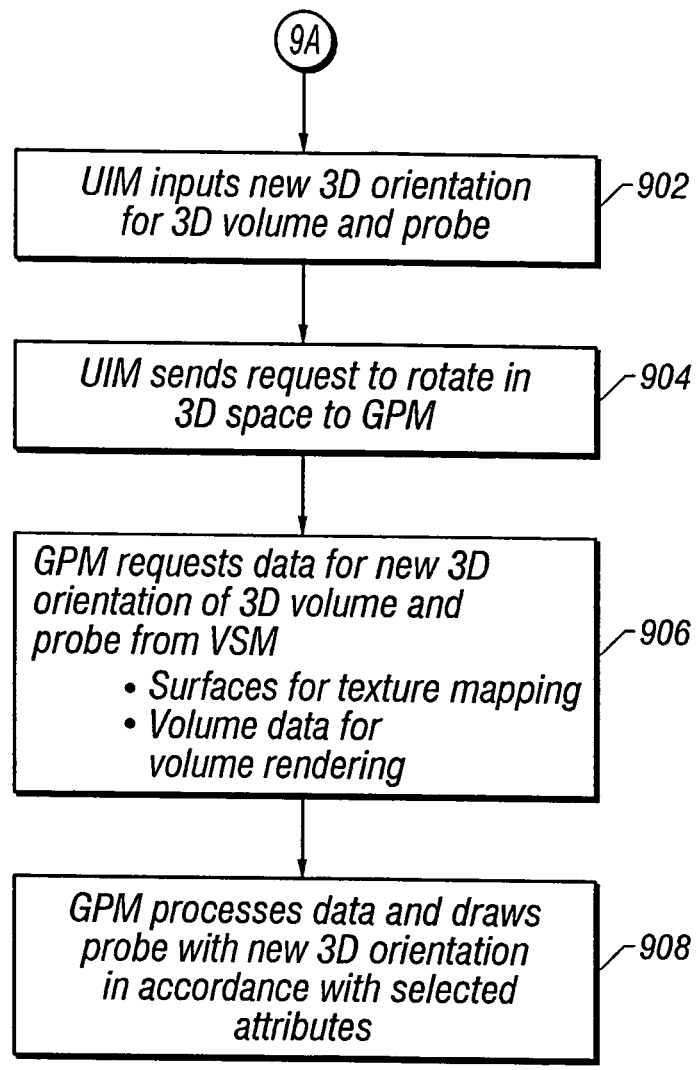
FIG. 9 shows a flow diagram of one embodiment for rotating a probe in 3D space.

If a user wants to rotate a probe in 3D space, then function 450 is carried out. In function 450, the 3D orientation, which is the same for both the 3D volume and the probe, is changed, thereby rotating the 3D volume and the probe in space. The steps for carrying out function 450 are shown in FIG. 9 by way of flow diagram connector 9A. In a step 902, the new 3D orientation for the 3D volume and the probe is input by UIM 210 from the user. In a preferred embodiment of the present invention, the user inputs the new orientation by clicking a mouse or other type of suitable user input device ta snap a pointer onto an axis of the probe to be rotated. Manipulation of the mouse or user input device changes the orientation of that axis. When the desired orientation is reached, the user again clicks the mouse or user input device to release the pointer from the axis. It would be readily apparent to one of skill in the relevant art how to implement such a change in orientation. It is to be understood, however, that the present invention is not limited to changing the orientation in this manner. For example, the user could select from a number of pre-set rotations (e.g., rotate 90° to the left or right; rotate 45° to the left or right, etc.) by activating a drop-down menu, or by scrolling through the rotations by repeatedly clicking a mouse.

In a step 904, UIM 210 sends a request to rotate in 3D space to GPM 220 to draw the rotated probe. In a step 906, GPM 220 requests data for the rotated probe from VSM 230. In a manner similar ta that described above, the data that is extracted from 3D or data volume 240 by VSM 230 will depend upon the opacity selected by the user for the probe being rotated. If the opacity settings selected by the user are such that all data values for the probe being rotated are opaque, then the data extracted by VSM 230 will be limited to the surfaces of the probe being rotated. Alternatively, if the opacity settings selected by the user for the probe being rotated are such that some of the data values are opaque and some of the data values are transparent, then the data extracted by VSM 230 will include the data corresponding to the entire volume of the probe being rotated. In this manner, the probe can be drawn with its new orientation more quickly by minimizing the quantity of data that must be processed.

In step 908, GPM 220 processes the data extracted by VSM 230 for the probe being rotated, and draws the probe with its new orientation in accordance with the attributes selected by the user, either by texture mapping onto the surfaces of the probe being rotated, or by volume rendering the entire volume of the probe being rotated.

As the user rotates the probe in 3D space, steps 902 through 908 are repeated at a rate sufficiently fast that the user perceives the image of the probe, with texture mapping or volume rendering as appropriate, changing in "real-time" with the changing orientation of the probe. The image is being re-drawn at a frame rate sufficiently fast to be perceived as real-time by the user. If a user wants to rotate a probe while it is fixed in 3D space, then function 460 is carried out. In function 460, the 3D orientation of the probe is rotated independently of the 3D orientation of the 3D volume, thereby rotating the probe while it is fixed in the 3D space defined by the orientation of the 3D volume. In this manner, the background planes for an active probe can be displayed in a fixed orientation, and the active probe can be rotated within the background planes.

Figure 10:
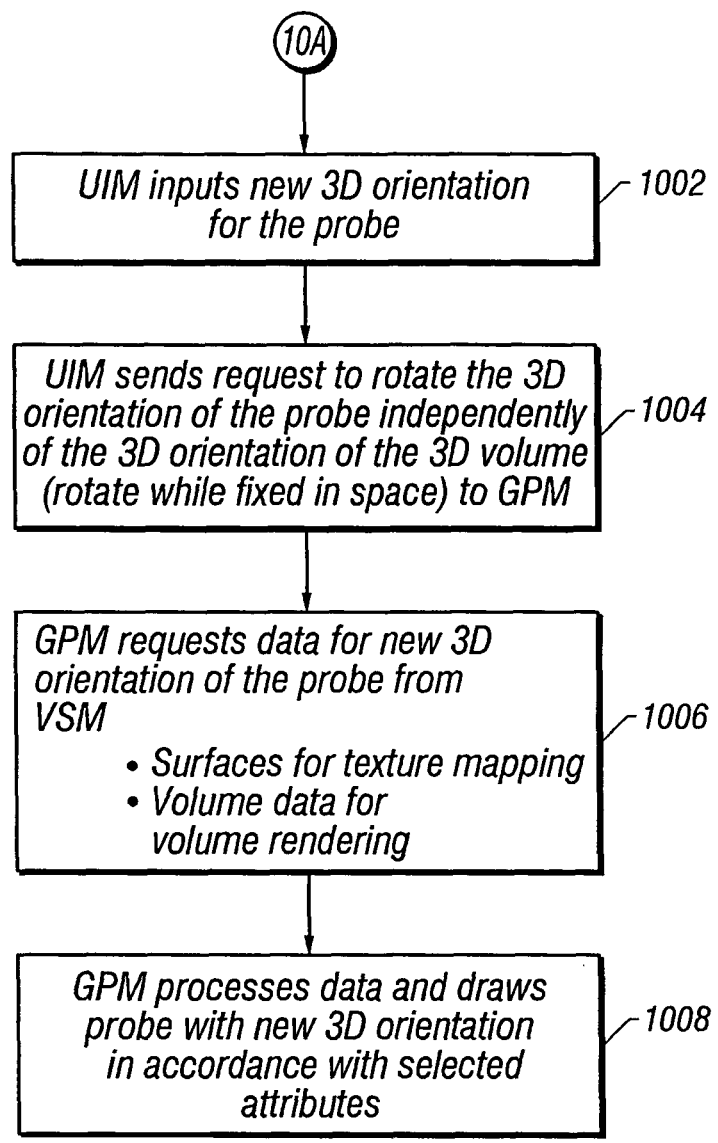
FIG. 10 shows a flow diagram of one embodiment for rotating a probe while fixed in space.

The steps for carrying out function 460 are shown in FIG. 10 by way of flow diagram connector 10A. In a step 1002, the new 3D orientation for the probe is input by UIM 210 from the user. In a preferred embodiment of the present invention, the user selects the option to rotate while fixed in space, for example, from a "drop-down" menu. The user then inputs the new orientation for the probe by clicking a mouse or other type of suitable user input device to snap a pointer onto an axis of the probe to be rotated. Manipulation of the mouse or user input device changes the orientation of that axis. When the desired orientation is reached, the user again clicks the mouse or user input device to release the pointer from the axis. It would be readily apparent to one of skill in the relevant art how to implement such a change in orientation. It is to be understood, however, that the present invention is not limited to changing the orientation in this manner. For example, the user could select from a number of pre-set rotations (e.g., rotate 90° to the left or right; rotate 45° to the left or right, etc.) by activating a drop-down menu, or by scrolling through the rotations by repeatedly clicking a mouse.

In a step 1004, UIM 210 sends a request to rotate while fixed in space to GPM 220 to draw the rotated probe. In a step 1006, GPM 220 requests data for the rotated probe from VSM 230. In a manner similar to that described above, the data that is extracted from 3D or data volume 240 by VSM 230 will depend upon the opacity selected by the user for the probe being rotated. If the opacity settings selected by the user are such that all data values for the probe being rotated are opaque, then the data extracted by VSM 230 will be limited to the surfaces of the probe being rotated. Alternatively, if the opacity settings selected by the user for the probe being rotated are such that some of the data values are opaque and some of the data values are transparent, then the data extracted by VSM 230 will include the data corresponding to the entire volume of the probe being rotated. In this manner, the probe can be drawn with its new orientation more quickly by minimizing the quantity of data that must be processed.

In step 1008, GPM 220 processes the data extracted by VSM 230 for the probe being rotated, and draws the probe with its new orientation in accordance with the attributes selected by the user, either by texture mapping onto the surfaces of the probe being rotated, or by volume rendering the entire volume of the probe being rotated.

As the user rotates the probe while it is fixed in space, steps 1002 through 1008 are repeated at a rate sufficiently fast that the user perceives the image of the probe, with texture mapping or volume rendering as appropriate, changing in "real-time" with the changing orientation of the probe. The image is being re-drawn at a frame rate sufficiently fast to be perceived as real-time by the user.

Figure 11:
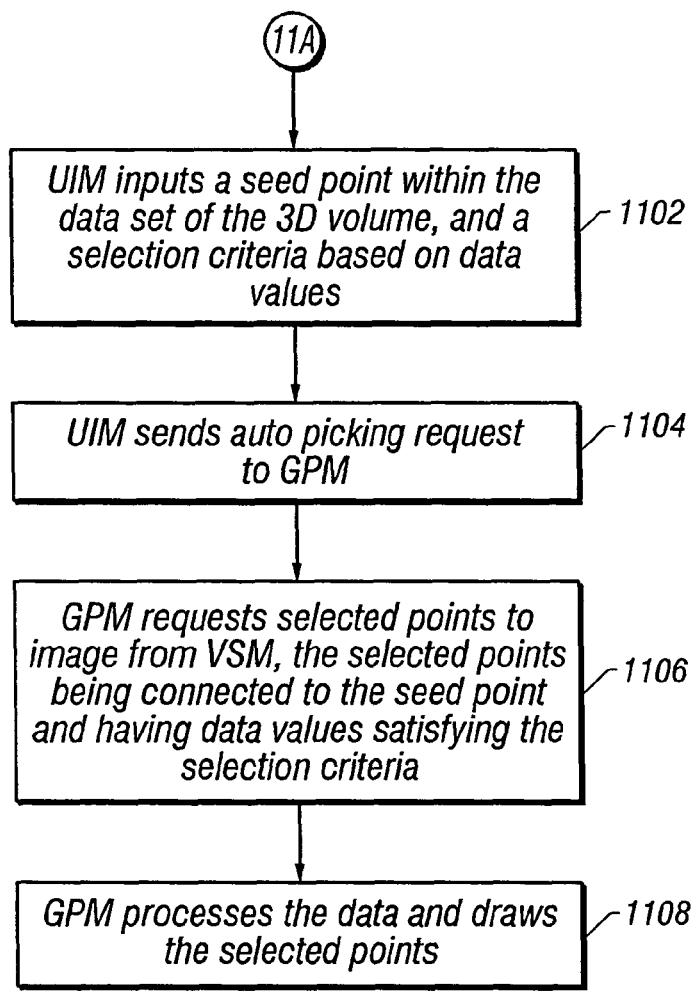
FIG. 11 shows a flow diagram of one embodiment for carrying out auto picking or seed selection.

If a user wants to carry out an "auto picking" process, then function 470 is carried out. The steps for carrying out function 470 are shown in FIG. 11 by way of flow diagram connector 11A. In a step 1102, a seed point within the data set of the 3D volume, and a selection criteria based on data values, are input by UIM 210 from the user. Preferably the seed point is within the data set of voxels that defines a probe. As described below, such a probe is referred to herein as a seed 3D sampling probe or an eraser 3D sampling probe. However, the seed point can be within the data set of voxels that defines the 3D volume, outside of an active probe. In a preferred embodiment of the present invention, the user selects the option to execute an auto picking process, for example, from a "drop-down" menu. The user then selects the seed point by clicking a mouse or other type of suitable user input device to snap a pointer onto the desired seed point. The selection criteria can be input, for example, by graphically selecting a range, or by keying in specific numerical values. It would be readily apparent to one of skill in the relevant art how to input from the user a seed point and filter range of data values.

In a step 1104, UIM 210 sends an auto picking request to GPM 220 to draw the rotated probe. In a step 1106, GPM 220 requests selected points to image from VSM 230. The selected points are those that are connected to the seed point, and that have a data value within the selection criteria.

In step 1108, GPM 220 processes the data extracted by VSM 230 to draw the selected points. The selected points are preferably highlighted within the probe by being drawn in a color different from those used to depict the features or physical parameters of the 3D volume data set. Alternatively, step 1108 can be carried out to "erase" or delete from the probe the selected points.

In a similar manner, auto picking function 470 can be used to "erase" or de-select points. For example, an eraser 3D sampling probe is defined, such as by invoking function 420 to create an additional probe. A "de-selection" criteria based on data values is defined. Points previously selected by an auto picking operation that satisfy the de-selection criteria are identified as candidates for de-selection. As the eraser 3D sampling probe moves through the 3D volume, the de-selected points are deleted from the image, and the image is re-drawn sufficiently fast to be perceived as real-time by the user.

Once auto picking function 470 is initiated by the user, it can be carried out simultaneously with, for example, move function 430. In this manner, as the user moves the probe, steps 1102 through 1108 (and steps 702 through 708) are repeated at a rate sufficiently fast that the user perceives the image of the probe, with the selected points, changing in "real-time" with the changing location of the probe. As the probe is moved, the selected points can be highlighted within the probe or within the probe and 3D volume by being drawn in a suitable color, thereby having the auto picking 3D sampling probe function as a "highlighter" as it moves through the 3D volume. Alternatively, as the probe is moved, points previously selected by an auto picking operation can be "erased" or deleted from the probe or the probe and 3D volume, thereby having the probe function as an "eraser" or eraser 3D sampling probe as it moves through the 3D volume. In either embodiment, the image is being re-drawn at a frame rate sufficiently fast to be perceived as real-time by the user.

Figure 12:
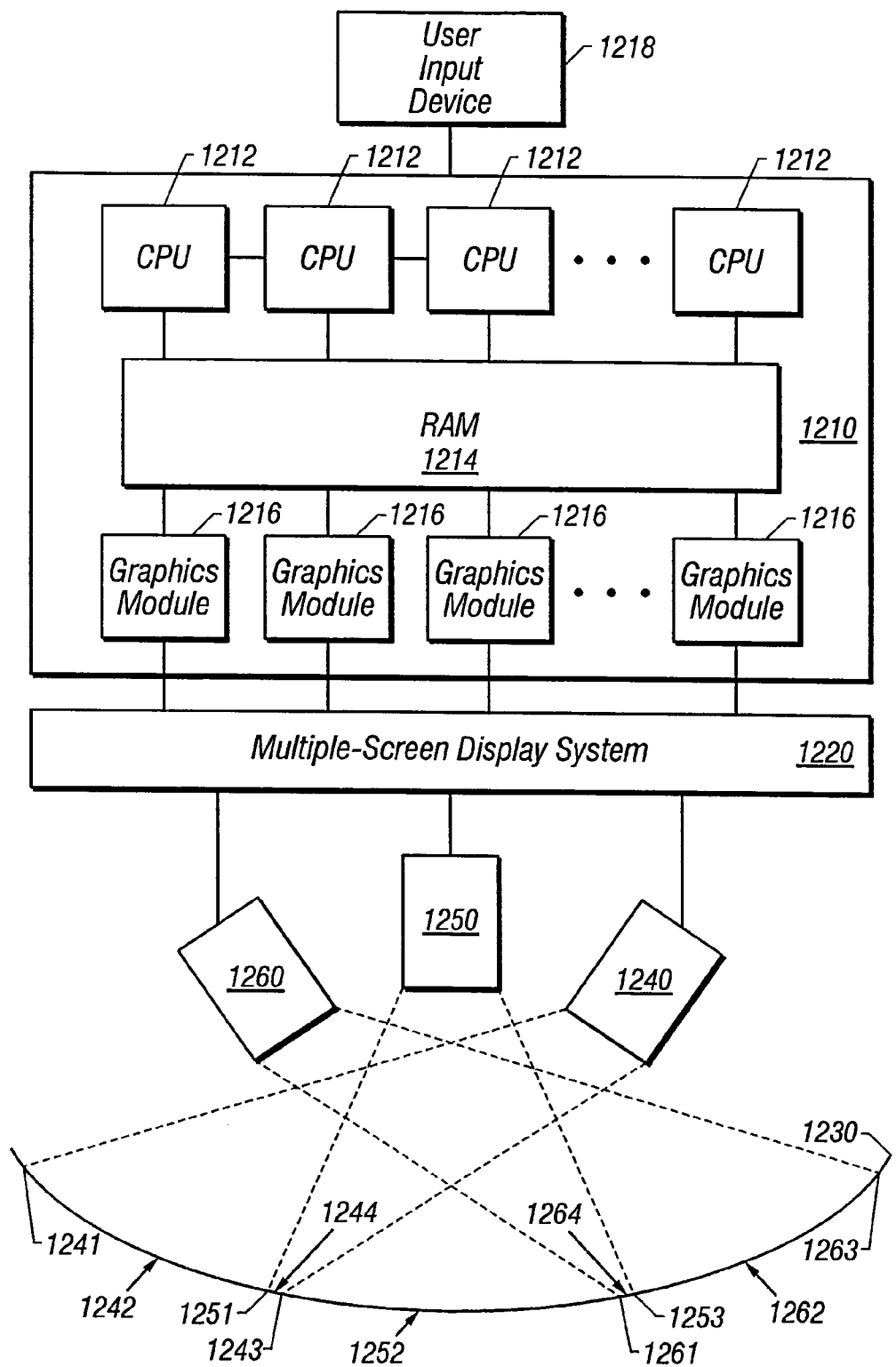
FIG. 12 shows one embodiment of a computer system suitable for use with the present invention.

With reference now to FIG. 12, one embodiment of a computer system suitable for use with the present invention is shown. A graphics supercomputer 1210 contains one or more central processing units (CPU) or processors 1212. Supercomputer 1210 contains a random access memory (RAM) 1214 that can be accessed by processors 1212. Supercomputer 1210 also contains one or more graphics modules 1216 that also access RAM 1214. Graphics modules 1216 execute the functions carried out by Graphics Processing Module 220, using hardware (such as specialized graphics processors) or a combination of hardware and software. A user input device 1218 allows a user to control and input information to graphics supercomputer 1210.

A particularly preferred graphics supercomputer is an Onyx2 Infinite Reality system, available from Silicon Graphics, Inc., Mountain View, Calif., configured with eight processors, three graphics pipelines, 16 GB of main memory, and 250 GB of disk memory. Such a graphics supercomputer has a scalable, high-bandwidth, low-latency architecture to provide high speed rendering on multiple graphics pipelines. Graphics supercomputers from other vendors, such as Hewlett-Packard Company of Palo Alto, Calif. or Sun Microsystems of Mountain View, Calif. could also be used.

The graphics data forming the image to be displayed is sent from graphics supercomputer 1210 to a multiple-screen display system 1220 for projection onto a screen 1230. In the embodiment shown in FIG. 12, three projectors are used. From the perspective of a user viewing the image on screen 1230, the three projectors include a left projector 1240, a center projector 1250, and a right projector 1260. Although three projectors are shown, the present invention is not limited to the use of any particular number of projectors.

Projector 1240 has a projection field on screen 1230, shown generally at 1242, between a point 1241 and a point 1243. Projector 1250 has a projection field on screen 1230, shown generally at 1252, between a point 1251 and a point 1253. Projector 1260 has a projection field on screen 1230, shown generally at 1262, between a point 1261 and a point 1263. Projection fields 1242 and 1252 have an overlap region 1244, between points 1251 and 1243. Similarly, projection fields 1262 and 1252 have an overlap region 1264, between points 1261 and 1253. The image to be displayed is divided into three (left, center, and right) over-lapping sub-images.

By simultaneously projecting the three over-lapping sub-images, the field-of-view to the user is increased over that available, for example, on a monitor or through the use of just one projector. As an example, use of the three over-lapping sub-images shown in FIG. 12 increases the field-of-view to approximately 160°. Overlap regions 1244 and 1264 are each approximately 5.3°. Multiple-screen display system 1220 accounts for overlap regions 1244 and 1264 in a well-known manner to edge-blend the images of the three projectors to form one seamless image on screen 1230. Suitable display and projector systems are available from SEOS, London, England, such as the Barco projector units.

Figure 13:
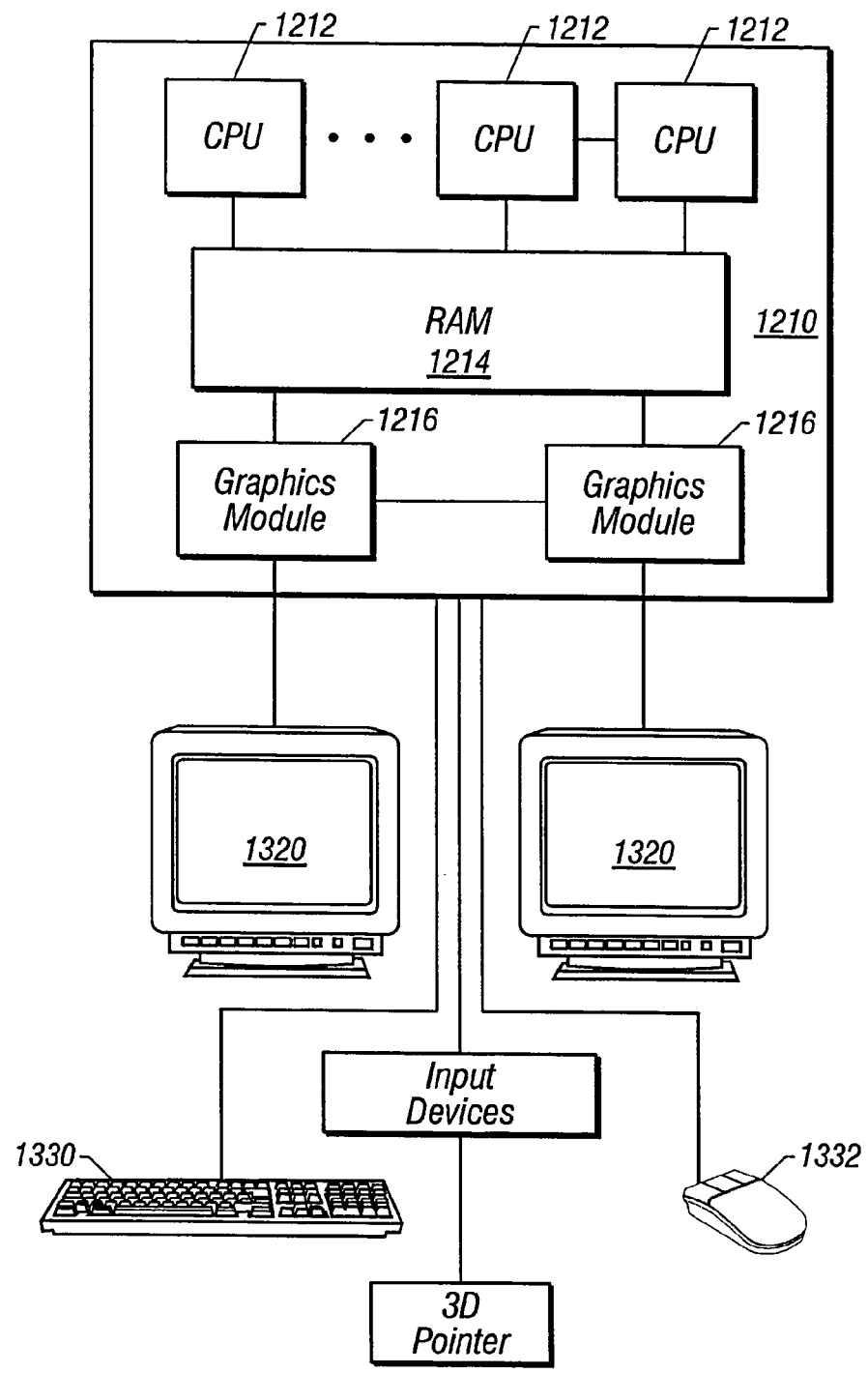
FIG. 13 shows an alternate embodiment of a computer system suitable for use with the present invention.

FIG. 13 shows an alternate embodiment of a computer system suitable for use with the present invention. In the embodiment shown in FIG. 13, graphics supercomputer 1210 is configured with multiple processors 1212, RAM 1214, and two graphics modules 1216. Graphics workstations suitable for use in the embodiment shown in FIG. 13 are available from Silicon Graphics, Inc. or Sun Microsystems. Each graphics module 1216 is connected to a monitor 1320 for display. Monitor 1320 should preferably be a color graphics monitor suitable for display of graphics such as that shown in FIGS. 15 and 16. Preferably, one of monitors 1320 displays the image of the 3D sampling probes, and the other of monitors 1320 displays the various menus used to operate 3D sampling probe program 110. FIG. 13 also shows a keyboard 1330 and a mouse 1332 that function as user input devices.

Figure 14:
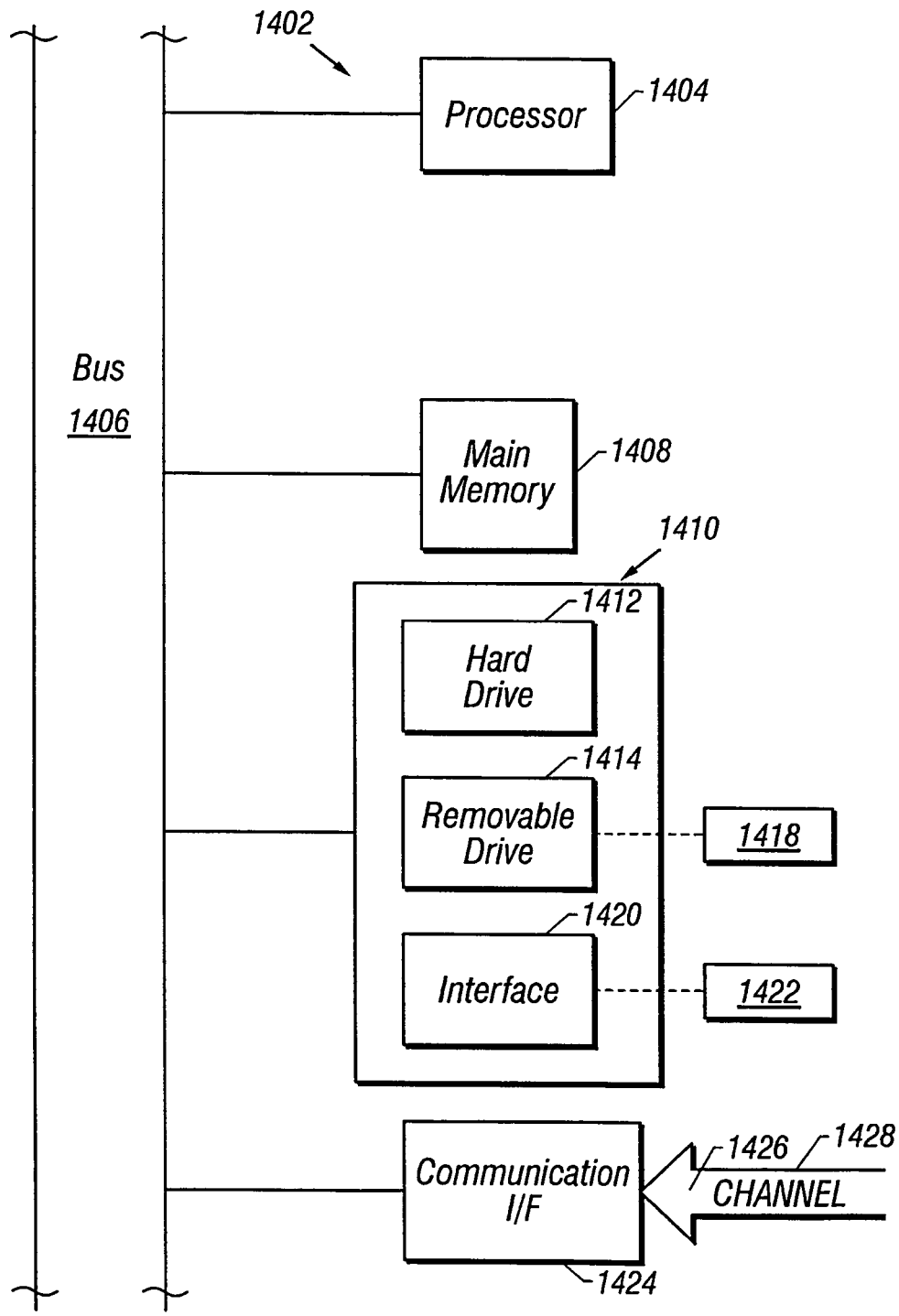
FIG. 14 shows further detail of an exemplary computer system suitable for use with the present invention.

A computer system capable of carrying out the functionality described herein is shown in more detail in FIG. 14. Computer system 1402 includes one or more processors, such as processor 1404. Processor 1404 is connected to a communication bus 1406. Various software embodiments are described in terms of this exemplary computer system. After reading this description, it will become apparent to a person skilled in the relevant art how to implement the invention using other computer systems and/or computer architectures.

Computer system 1402 also includes a main memory 1408, preferably random access memory (RAM), and can also include a secondary memory 1410. Secondary memory 1410 can include, for example, a hard disk drive 1412 and/or a removable storage drive 1414, representing a floppy disk drive, a magnetic tape drive, an optical disk drive, etc. Removable storage drive 1414 reads from and/or writes to a removable storage unit 1418 in a well-known manner. Removable storage unit 1418, represents a floppy disk, magnetic tape, optical disk, etc. which is read by and written to by removable storage drive 1414. As will be appreciated, removable storage unit 1418 includes a computer usable storage medium having stored therein computer software and/or data.

In alternative embodiments, secondary memory 1410 may include other similar means for allowing computer programs or other instructions to be loaded into computer system 1402. Such means can include, for example, a removable storage unit 1422 and an interface 1420. Examples of such can include a program cartridge and cartridge interface (such as that found in video game devices), a removable memory chip (such as an EPROM, or PROM) and associated socket, and other removable storage units 1422 and interfaces 1420 which allow software and data to be transferred from removable storage unit 1422 to computer system 1402.

Computer system 1402 can also include a communications interface 1424. Communications interface 1424 allows software and data to be transferred between computer system 1402 and external devices. Examples of communications interface 1424 can include a modem, a network interface (such as an Ethernet card), a communications port, a PCM-CIA slot and card, etc. Software and data transferred via communications interface 1424 are in the form of signals 1426 that can be electronic, electromagnetic, optical or other signals capable of being received by communications interface 1424. Signals 1426 are provided to communications interface via a channel 1428. Channel 1428 carries signals 1426 and can be implemented using wire or cable, fiber optics, a phone line, a cellular phone link, an RF link and other communications channels.

In this document, the terms "computer program medium" and "computer usable medium" are used to generally refer to media such as removable storage device 1418, a hard disk installed in hard disk drive 1412, and signals 1426. These computer program products are means for providing software to computer system 1402.

Computer programs (also called computer control logic) are stored in main memory 1408 and/or secondary memory 1410. Computer programs can also be received via communications interface 1424. Such computer programs, when executed, enable computer system 1402 to perform the features of the present invention as discussed herein. In particular, the computer programs, when executed, enable processor 1404 to perform the features of the present invention. Accordingly, such computer programs represent controllers of computer system 1402.

In an embodiment where the invention is implemented using software, the software may be stored in a computer program product and loaded into computer system 1402 using removable storage drive 1414, hard drive 1412 or communications interface 1424. The control logic (software), when executed by processor 1404, causes processor 1404 to perform the functions of the invention as described herein.

In another embodiment, the invention is implemented primarily in hardware using, for example, hardware components such as application specific integrated circuits (ASICs). Implementation of such a hardware state machine so as to perform the functions described herein will be apparent to persons skilled in the relevant art(s).

In yet another embodiment, the invention is implemented using a combination of both hardware and software.

System Operation and Results

The operation and results of the present invention will now be described, using a data volume 240 that contains seismic data (data values representing seismic amplitudes). The user specifies the particular seismic data volume to be used, which is loaded from disk into main memory. A default 3D sampling probe is drawn. The user specifies the colors to be used for the seismic amplitudes, such as the red, blue. and white shown in FIGS. 15 and 16. The degree of transparency can also be selected. The three probes shown in FIG. 15 are all opaque, with the intersection of the probes and the seismic data volume texture mapped onto the surfaces of the probes. One of the probes is displayed with the bounding geometry shown; the other two probes are displayed without the bounding geometry.

FIG. 15 shows three active probes. The user has selected not to display the data contained in the background planes and in the remainder of the seismic data volume outside of the active probes. Two of the probes shown in FIG. 15 intersect each other, and the intersection of the two probes is displayed. In this manner, the user can more readily visualize and interpret geologic features inherent in the seismic data volume. For example. a geologic feature. represented by a dark red band between two light blue bands. extends across the face of the larger intersecting probe and "turns the corner" to extend onto the face of the smaller intersecting probe perpendicular to it. The ability to move and intersect the probes with each other, and throughout the seismic data volume, enables a user to better interpret and track the extent of such a geologic feature.

FIG. 16 illustrates how one probe can be used to "cut" another probe to create a "hole" in a probe. As with FIG. 15, the user has selected not to display the data contained in the background planes and in the remainder of the seismic data volume outside of the active probes. FIG. 16 illustrates that the opacity settings can be individually selected by the user for each active probe. One of the probes shown in FIG. 16 is opaque, so that it is not possible to see through the surfaces of this probe. In order to see internal to this outer probe, it must be cut away by another probe. The outer opaque probe is referred to as a "data probe". A second completely transparent "cut probe" has been used to cut out a 3D sub-section of the data probe. Because the cut probe is completely transparent, it is not visible in FIG. 16. However, the fact that the completely transparent cut probe is present is evidenced by the fact that the opaque internal surfaces of the data probe are visible. The image of the intersection of the data probe and the cut probe is the intersecting surface internal to the data probe.

A third active probe is shown in FIG. 16. The third probe is displayed with the bounding geometry shown. The third probe is volume rendered with varying degrees of transparency so that the user can see through the outer surfaces of the probe and view geologic features within the third probe. As shown in FIG. 16, the third probe is volume rendered partially within the 3D sub-section of the data probe that has been cut away by the cut probe.

The third volume-rendered probe shown in FIG. 16 also contains selected points that have been selected through a seed picking process (function 470). The selected points have been imaged in a manner to highlight them for the user. The selected points are shown in FIG. 16 as the yellow highlighted points. The seed point is illustrated in FIG. 16 by the darker sphere.

By using the system and method of the present invention, geologists and geophysicists can more quickly and accurately visualize and interpret 3D seismic data. This sharply reduces 3D seismic project cycle time, boosts production from existing fields, and finds more reserves.

Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A non-transitory program storage device readable by a machine, the device tangibly embodying a program of instructions executable by the machine to perform method steps of imaging a three-dimensional (3D) volume, the method steps comprising:
    creating one or more three-dimensional (3D) sampling probe(s), wherein each 3D sampling probe is a sub-volume of the 3D volume;
    drawing an image of the 3D sampling probe(s), the image comprising an intersection of the 3D sampling probe(s) and the 3D volume; and
    repeating the drawing step responsive to movement of the 3D sampling probe(s) within the 3D volume so that as the 3D sampling probe(s) moves through the 3D volume, the image of the 3D sampling probe(s) is redrawn substantially at the same time as the 3D sampling probe is moved.

2. The program storage device of claim 1, wherein the method steps further comprise:
    repeating the drawing step to reshape the 3D sampling probe(s) so that as the 3D sampling probe(s) is changed in shape, the image of the 3D sampling probe(s) is redrawn substantially at the same time.

3. The program storage device of claim 2, wherein the method steps further comprise:
    repeating the drawing step to rotate a 3D orientation of the 3D volume and the 3D sampling probe(s) so that as the 3D orientation is changed, the image of the 3D sampling probe(s) is redrawn substantially at the same time.

4. The program storage device of claim 2, wherein the method steps further comprise:
    repeating the drawing step to rotate a 3D orientation of the 3D sampling probe(s) independently of a 3D orientation of the 3D volume so that as the 3D orientation of the 3D sampling probe(s) is changed, the image of the 3D sampling probe(s) is redrawn substantially at the same time.

5. The program storage device of claim 1, wherein the image of the 3D sampling probe(s) is redrawn at a frame rate of at least about 10 to 15 frames per second.

6. The program storage device of claim 1, wherein the drawing step comprises:
    extracting from the 3D volume a sub-volume data set corresponding to the surfaces of the 3D sampling probe(s); and
    texture mapping the sub-volume data set onto the surfaces of the 3D sampling probe(s).

7. The program storage device of claim 1, wherein the method steps further comprise:
    repeating the drawing step to rotate a 3D orientation of the 3D volume and the 3D sampling probe(s) so that as the 3D orientation is changed, the image of the 3D sampling probe(s) is redrawn substantially at the same time.

8. The program storage device of claim 1, wherein the method steps further comprise:
    repeating the drawing step to rotate a 3D orientation of the 3D sampling probe(s) independently of a 3D orientation of the 3D volume so that as the 3D orientation of the 3D sampling probe(s) is changed, the image of the 3D sampling probe(s) is redrawn substantially at the same time.

9. The program storage device of claim 1, wherein the drawing step comprises:
    drawing an image of an intersection of one of the 3D sampling probes with another one of the 3D sampling probes.

10. The program storage device of claim 9, wherein the one of the 3D sampling probe(s) is a data probe and the another one of the 3D sampling probe(s) is a substantially transparent cut probe that cuts out a 3D sub-section of the data probe so that the image of the intersection of the data probe and the cut probe comprises an intersecting surface internal to the data probe.

11. The program storage device of claim 10, wherein the drawing step comprises:
    drawing an image of a third 3D sampling probe, wherein the third 3D sampling probe is volume rendered at least partially within the 3D sub-section of the data probe.

12. The program storage device of claim 1, wherein the drawing step comprises:
    dividing the image of the 3D sampling probe(s) into a plurality of over-lapping sub-images; and
    simultaneously drawing the plurality of over-lapping sub-images, thereby increasing a field-of-view to the user.

13. The program storage device of claim 1, wherein the 3D volume is defined by a data set of voxels, each voxel expressed in the form of x, y, z, data value.

14. The program storage device of claim 13, wherein the data value comprises data selected from the group comprising seismic data, remote sensing data, well log data, gravity and magnetic field data, sidescan sonar image data, temperature, pressure, saturation, reflectivity, acoustical impedance and velocity.

15. The program storage device of claim 13, wherein the drawing step comprises:
 extracting from the 3D volume a sub-volume data set corresponding to the 3D sampling probe(s); and
 volume rendering the sub-volume data set in accordance with a transparency setting that is a function of each data value, thereby volume imaging the 3D sampling probe(s).

16. The program storage device of claim 13, wherein the method steps further comprise:
 identifying a seed point, wherein the seed point is a voxel within the data set of voxels that defines one of the 3D sampling probe(s); and
 defining a selection criteria based on the data values, the drawing step being carried out to image selected points only within the 3D sampling probe, wherein the selected points are connected to the seed point, and the data values of the selected points satisfy the selection criteria.

17. The program storage device of claim 16, wherein the 3D sampling probe containing the seed point is an auto picking 3D sampling probe, wherein the repeating step is carried out so that as the auto picking 3D sampling probe moves through the 3D volume, the image of the selected points is redrawn within at least one of the auto picking 3D sampling probe and the 3D volume substantially at the same time.

18. The program storage device of claim 17, wherein the repeating step is carried out so that as the auto picking 3D sampling probe moves through the 3D volume, the image of the selected points is redrawn only within the auto picking 3D sampling probe substantially at the same time.

19. The program storage device of claim 17, wherein the method steps further comprise:
 defining an eraser 3D sampling probe; and
 defining a de-selection criteria based on data values, wherein the repeating step is carried out so that as the eraser 3D sampling probe moves through the selected points that satisfy the de-selection criteria, the selected points that satisfy the de-selection criteria are deleted from the image substantially at the same time.

20. The program storage device of claim 1, wherein the image of the 3D sampling probe(s) is redrawn substantially at the same time as the 3D sampling probe(s) moves through the 3D volume so that a user-selected feature defined by the data values is at least partially visualized.

21. A non-transitory program storage device readable by a machine, the device tangibly embodying a program of instructions executable by the machine to perform method steps of imaging a three-dimensional (3D) volume, the method steps comprising:
 creating a three-dimensional (3D) sampling probe, wherein the 3D sampling probe is a sub-volume of the 3D volume;
 drawing an image of at least one of the 3D sampling probe and the 3D volume, the image comprising an intersection of the 3D sampling probe and the 3D volume; and
 repeating the drawing step responsive to movement of the 3D sampling probe within the 3D volume so that as the 3D sampling probe moves through the 3D volume, the image of the 3D sampling probe is redrawn substantially at the same time as the 3D sampling probe is moved.

22. The program storage device of claim 21, wherein the 3D sampling probe is a data probe and the 3D volume is substantially transparent.

23. The program storage device of claim 21, wherein the 3D sampling probe is a substantially transparent cut probe and the 3D volume comprises a visible data set of voxels, each voxel expressed in the form of x, y, z, data value.

24. A method for imaging a three-dimensional (3D) data volume, the method comprising the steps of:
 creating a three-dimensional (3D) sampling probe wherein the 3D sampling probe is a sub-volume of the 3D volume;
 drawing an image of at least one of the 3D sampling probe and the 3D volume using a computer processor, the image comprising an intersection of the 3D sampling probe and the 3D volume; and
 repeating the drawing step responsive to movement of the 3D sampling probe within the 3D volume so that as the 3D sampling probe moves through the 3D volume, the image of the 3D sampling probe is redrawn substantially at the same time as the 3D sampling probe is moved.

25. The method of claim 24, wherein the 3D sampling probe is a data probe and the 3D volume is substantially transparent.

26. The method of claim 24, wherein the 3D sampling probe is a substantially transparent cut probe and the 3D volume comprises a visible data set of voxels, each voxel expressed in the form of x, y, z, data value.

27. A non-transitory program storage device readable by a machine, the device tangibly embodying a program of instructions executable by the machine to perform method steps of imaging a three-dimensional (3D) volume, the method steps comprising:
 creating one or more three-dimensional (3D) sampling probe(s), wherein each 3D sampling probe is a sub-volume of the 3D volume;
 drawing an image of the 3D sampling probe(s), the image comprising an intersection of the 3D sampling probe(s) and the 3D volume; and
 repeating the drawing step responsive to movement of the 3D sampling probe(s) within the 3D volume so that as the 3D sampling probe(s) moves through the 3D volume, the image of the 3D sampling probe(s) is redrawn sufficently fast to be perceived in real time as the 3D sampling probe is moved.

28. The program storage device of claim 27, wherein the method steps further comprise:
 repeating the drawing step to reshape the 3D sampling probe(s) so that as the 3D sampling probe(s) is changed in shape, the image of the 3D sampling probe(s) is redrawn in real time.

29. The program storage device of claim 27, wherein the image of the 3D sampling probe(s) is redrawn at a frame rate of at least about 10 to 15 frames per second.

30. The program storage device of claim 27, wherein the drawing step comprises:
 extracting from the 3D volume a sub-volume data set corresponding to the surfaces of the 3D sampling probe(s); and
 texture mapping the sub-volume data set onto the surfaces of the 3D sampling probe(s).

31. The program storage device of claim 27, wherein the method steps further comprise: repeating the drawing step to rotate a 3D orientation of the 3D volume and the 3D sampling probe(s) so that as the 3D orientation is changed, the image of the 3D sampling probe(s) is redrawn in real time.

32. The program storage device of claim 27, wherein the method steps further comprise:
repeating the drawing step to rotate a 3D orientation of the 3D sampling probe(s) independently of a 3D orientation of the 3D volume so that as the 3D orientation of the 3D sampling probe(s) is changed, the image of the 3D sampling probe(s) is redrawn in real time.

33. The program storage device of claim 28, wherein the method steps further comprise:
repeating the drawing step to rotate a 3D orientation of the 3D volume and the 3D sampling probe(s) so that as the 3D orientation is changed, the image of the 3D sampling probe(s) is redrawn in real time.

34. The program storage device of claim 28, wherein the method steps further comprise:
repeating the drawing step to rotate a 3D orientation of the 3D sampling probe(s) independently of a 3D orientation of the 3D volume so that as the 3D orientation of the 3D sampling probe(s) is changed, the image of the 3D sampling probe(s) is redrawn in real time.

35. The program storage device of claim 27, wherein the drawing step comprises:
drawing an image of an intersection of one of the 3D sampling probes with another one of the 3D sampling probes.

36. The program storage device of claim 35, wherein the one of the 3D sampling probe(s) is a data probe and the another one of the 3D sampling probe(s) is a substantially transparent cut probe that cuts out a 3D sub-section of the data probe so that the image of the intersection of the data probe and the cut probe comprises an intersecting surface internal to the data probe.

37. The program storage device of claim 36, wherein the drawing step comprises:
drawing an image of a third 3D sampling probe, wherein the third 3D sampling probe is volume rendered at least partially within the 3D sub-section of the data probe.

38. The program storage device of claim 27, wherein the drawing step comprises:
dividing the image of the 3D sampling probe(s) into a plurality of over-lapping sub-images; and
simultaneously drawing the plurality of over-lapping sub-images, thereby increasing a field-of-view to the user.

39. The program storage device of claim 27, wherein the 3D volume is defined by a data set of voxels, each voxel expressed in the form of x, y, z, data value.

40. The program storage device of claim 39, wherein the data value comprises data selected from the group comprising seismic data, remote sensing data, well log data, gravity and magnetic field data, sidescan sonar image data, temperature, pressure, saturation, reflectivity, acoustical impedance and velocity.

41. The program storage device of claim 39, wherein the drawing step comprises:
extracting from the 3D volume a sub-volume data set corresponding to the 3D sampling probe(s); and
volume rendering the sub-volume data set in accordance with a transparency setting that is a function of each data value, thereby volume imaging the 3D sampling probe(s).

42. The program storage device of claim 39, wherein the method steps further comprise:
identifying a seed point, wherein the seed point is a voxel within the data set of voxels that defines one of the 3D sampling probe(s); and
defining a selection criteria based on the data values, the drawing step being carried out to image selected points only within the 3D sampling probe, wherein the selected points are connected to the seed point, and the data values of the selected points satisfy the selection criteria.

43. The program storage device of claim 42, wherein the 3D sampling probe containing the seed paint is an auto picking 3D sampling probe, wherein the repeating step is carried out so that as the auto picking 3D sampling probe moves through the 3D volume, the image of the selected points is redrawn within at least one of the auto picking 3D sampling probe and the 3D volume in real time.

44. The program storage device of claim 43, wherein the repeating step is carried out so that as the auto picking 3D sampling probe moves through the 3D volume, the image of the selected points is redrawn only within the auto picking 3D sampling probe in real time.

45. The program storage device of claim 43, wherein the method steps further comprise:
defining an eraser 3D sampling probe; and
defining a de-selection criteria based on data values, wherein the repeating step is carried out so that as the eraser 3D sampling probe moves through the selected points that satisfy the de-selection criteria, the selected points that satisfy the de-selection criteria are deleted from the image in real time.

46. The program storage device of claim 27, wherein the image of the 3D sampling probe(s) is redrawn in real time as the 3D sampling probe(s) moves through the 3D volume so that a user-selected feature defined by the data values is at least partially visualized.

47. A non-transitory program storage device readable by a machine, the device tangibly embodying a program of instructions executable by the machine to perform method steps of imaging a three-dimensional (3D) volume, the method steps comprising:
creating a three-dimensional (3D) sampling probe, wherein the 3D sampling probe is a sub-volume of the 3D volume;
drawing an image of at least one of the 3D sampling probe and the 3D volume, the image comprising an intersection of the 3D sampling probe and the 3D volume; and
repeating the drawing step responsive to movement of the 3D sampling probe within the 3D volume so that as the 3D sampling probe moves through the 3D volume, the image of the 3D sampling probe is redrawn sufficiently fast to be perceived in real time as the 3D sampling probe is moved.

48. The program storage device of claim 47, wherein the 3D sampling probe is a data probe and the 3D volume is substantially transparent.

49. The program storage device of claim 47, wherein the 3D sampling probe is a substantially transparent cut probe and the 3D volume comprises a visible data set of voxels, each voxel expressed in the form of x, y, z, data value.

50. A method for imaging a three-dimensional (3D) data volume, the method comprising the steps of:
creating a three-dimensional (3D) sampling probe wherein the 3D sampling probe is a sub-volume of the 3D volume;
drawing an image of at least one of the 3D sampling probe and the 3D volume using a computer processor, the image comprising an intersection of the 3D sampling probe and the 3D volume; and
repeating the drawing step responsive to movement of the 3D sampling probe within the 3D volume so that as the 3D sampling probe moves through the 3D volume, the image of the 3D sampling probe is redrawn sufficiently fast to be perceived in real time as the 3D sampling probe is moved.

51. The method of claim 50, wherein the 3D sampling probe is a data probe and the 3D volume is substantially transparent.

52. The method of claim 50, wherein the 3D sampling probe is a substantially transparent cut probe and the 3D volume comprises a visible data set of voxels, each voxel expressed in the form of x, y, z, data value.

* * * * *